United States Patent
Pitts et al.

(10) Patent No.: US 10,897,608 B2
(45) Date of Patent: Jan. 19, 2021

(54) CAPTURING LIGHT-FIELD IMAGES WITH UNEVEN AND/OR INCOMPLETE ANGULAR SAMPLING

(71) Applicant: Google LLC, Mountain View, CA (US)

(72) Inventors: Colvin Pitts, Snohomish, WA (US); Chia-Kai Liang, San Jose, CA (US); Kurt Akeley, Saratoga, CA (US)

(73) Assignee: GOOGLE LLC, Mountain View, CA (US)

( * ) Notice: Subject to any disclaimer, the term of this patent is extended or adjusted under 35 U.S.C. 154(b) by 63 days.

(21) Appl. No.: 16/032,261

(22) Filed: Jul. 11, 2018

(65) Prior Publication Data

US 2019/0124318 A1    Apr. 25, 2019

Related U.S. Application Data

(63) Continuation of application No. 15/142,565, filed on Apr. 29, 2016, now Pat. No. 10,033,986.

(60) Provisional application No. 62/166,595, filed on May 26, 2015.

(51) Int. Cl.
*H04N 13/229*    (2018.01)
*G02B 3/00*    (2006.01)
*H04N 13/218*    (2018.01)
*H04N 13/232*    (2018.01)

(52) U.S. Cl.
CPC ........... *H04N 13/229* (2018.05); *G02B 3/005* (2013.01); *G02B 3/0056* (2013.01); *H04N 13/218* (2018.05); *H04N 13/232* (2018.05)

(58) Field of Classification Search
CPC .. H04N 13/229; H04N 13/232; H04N 13/218; G02B 3/0056; G02B 3/005
See application file for complete search history.

(56) References Cited

U.S. PATENT DOCUMENTS

| 2010/0265385 A1* | 10/2010 | Knight | H04N 9/8205 348/340 |
| 2013/0229532 A1* | 9/2013 | Tsutsumi | H04N 17/002 348/187 |

* cited by examiner

*Primary Examiner* — Mekonnen D Dagnew

(57) ABSTRACT

A light-field camera may generate four-dimensional light-field data indicative of incoming light. The light-field camera may have an aperture configured to receive the incoming light, an image sensor, and a microlens array configured to redirect the incoming light at the image sensor. The image sensor may receive the incoming light and, based on the incoming light, generate the four-dimensional light-field data, which may have first and second spatial dimensions and first and second angular dimensions. The first angular dimension may have a first resolution higher than a second resolution of the second angular dimension.

14 Claims, 24 Drawing Sheets

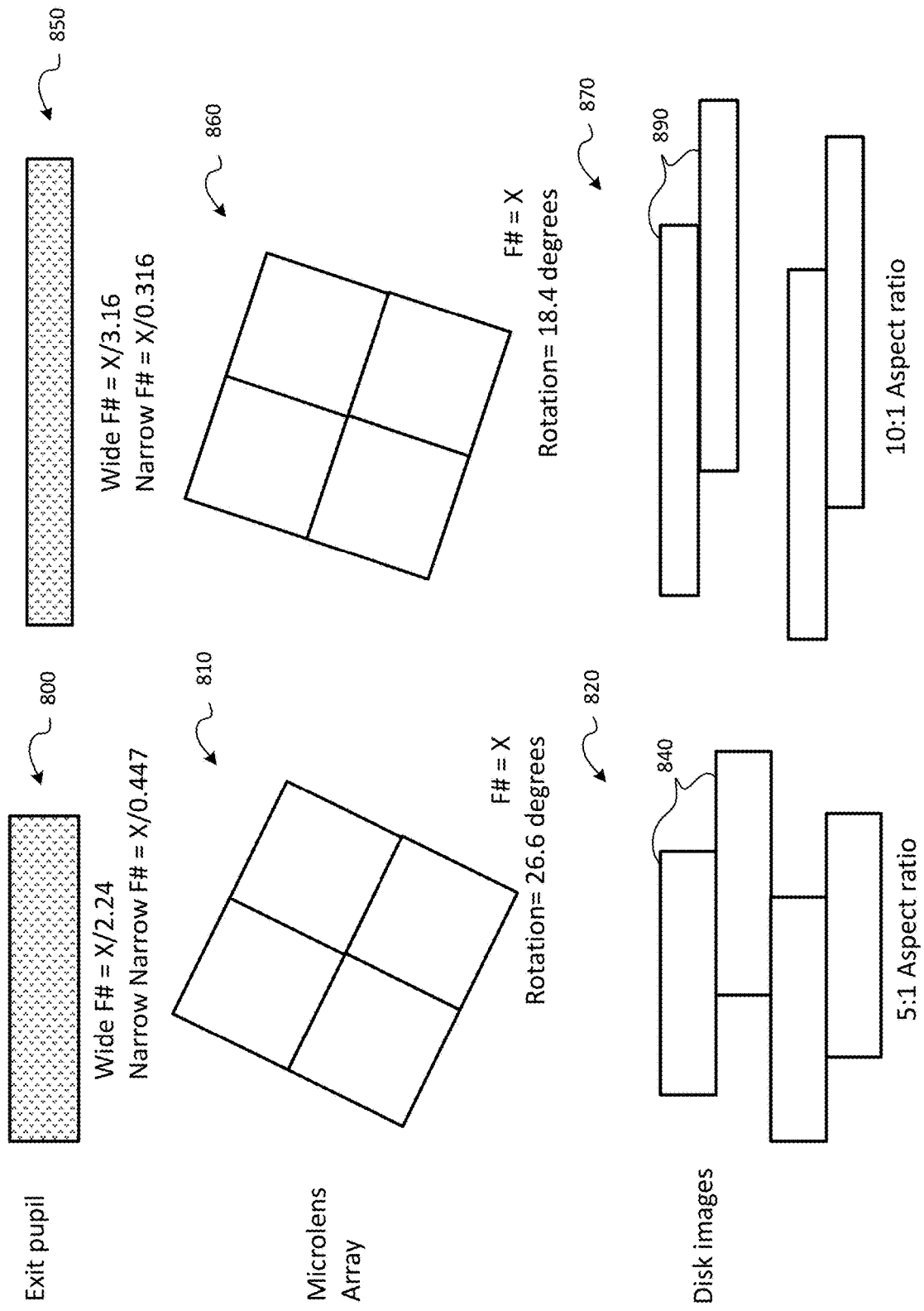

Yellow box: [sqrt(3)D x 0.5D] -> [sqrt(3)A x 0.5A] (86%)

Sampling vector: [1, 0]D x [1.5, 0.5*sqrt(3)]D
Prefilter: D x D

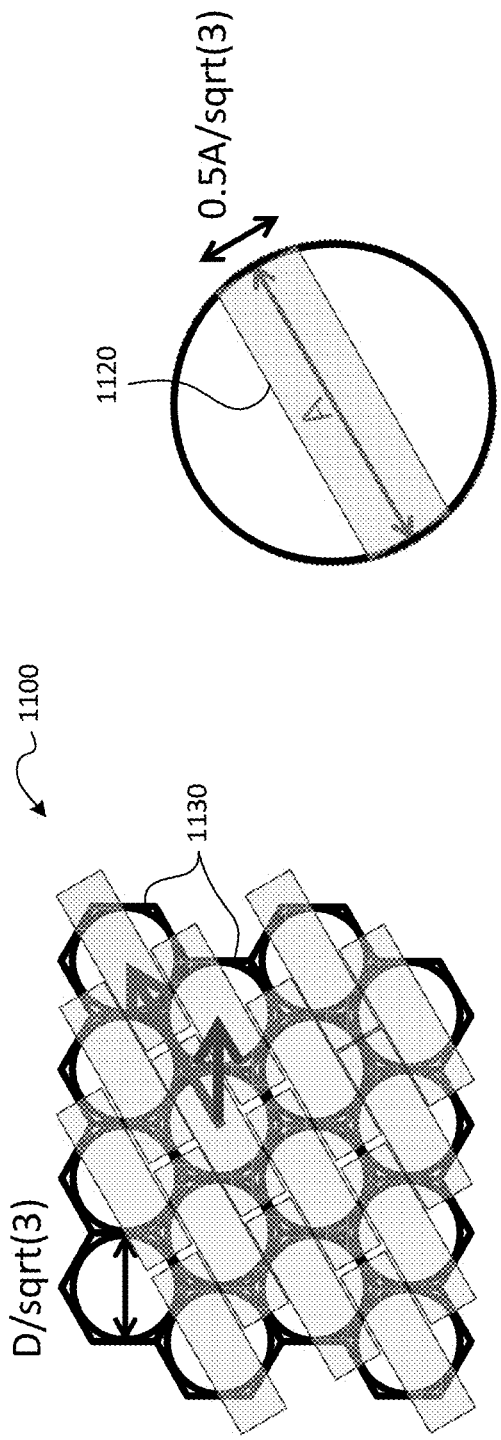

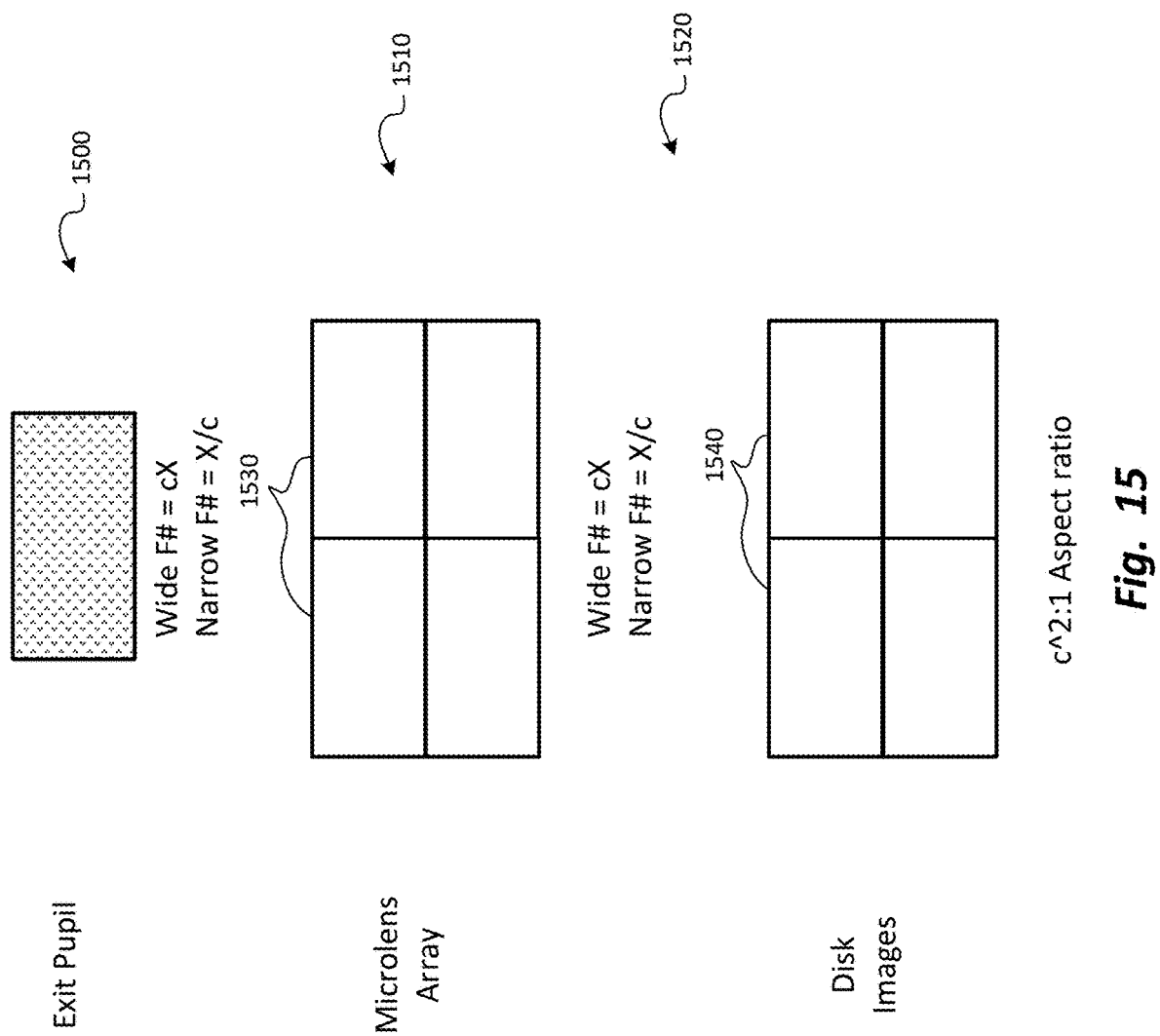

5:1 Aspect ratio

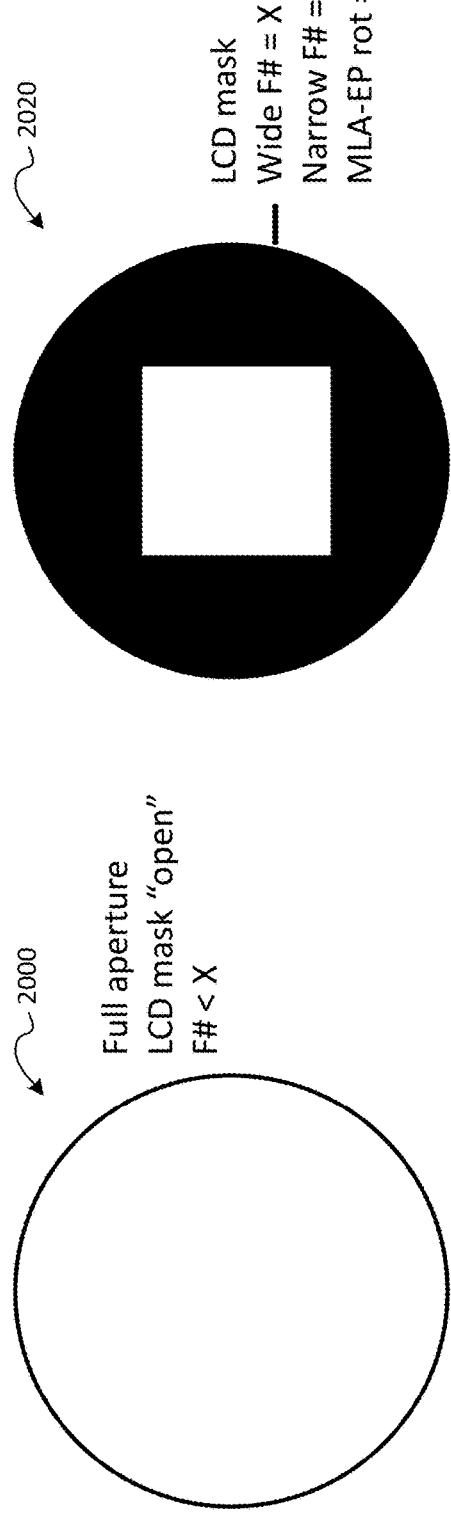
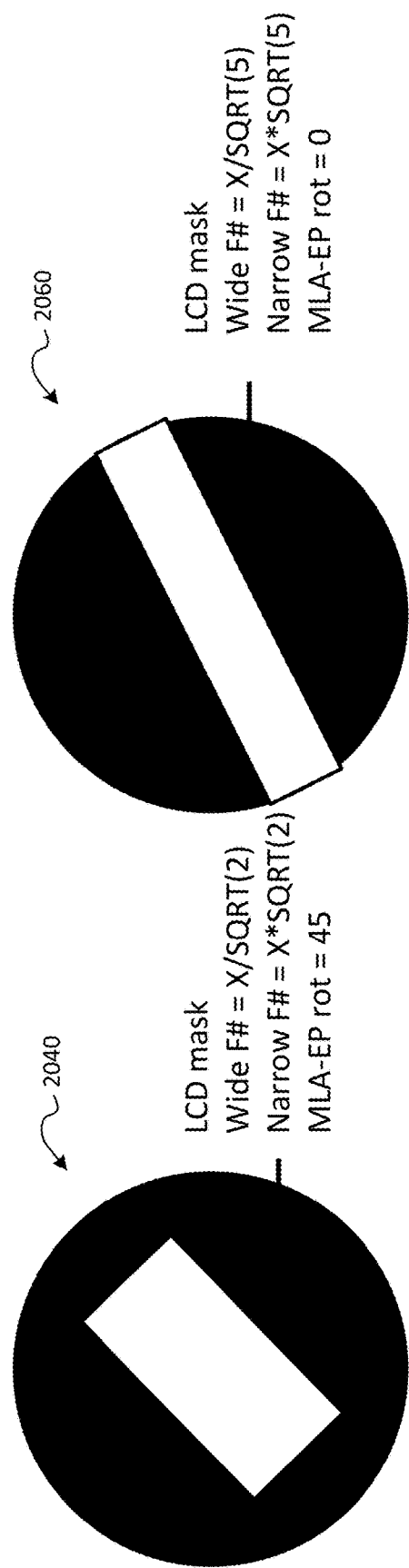
Fig. 20A
Fig. 20B
Fig. 20C
Fig. 20D

CAPTURING LIGHT-FIELD IMAGES WITH UNEVEN AND/OR INCOMPLETE ANGULAR SAMPLING

CROSS-REFERENCE TO RELATED APPLICATIONS

The present application claims the benefit of U.S. Provisional Application Ser. No. 62/166,595 for "Capturing Light-field Images with Uneven and/or Incomplete Angular Sampling", filed May 26, 2015, the disclosure of which is incorporated herein by reference in its entirety.

TECHNICAL FIELD

The present document relates to the use of multiple light-field cameras to capture images with uneven and/or irregular angular sampling.

BACKGROUND

Light-field cameras may be used to capture a four-dimensional (4D) light-field image, with two spatial dimensions, x and y, and two angular dimensions, u and v. In many light-field cameras, a plenoptic microlens array and a single photosensor, containing a two-dimensional (2D) array of pixels, are used. These plenoptic light-field cameras capture image data that may be much more versatile than traditional two-dimensional image data. In particular, a light-field image may be processed to create a set of virtual views, in which focus distance, center of perspective, depth-of-field, and/or other virtual-camera parameters are varied within ranges enabled by the data in the four-dimensional light-field image. Further, the light-field data may be analyzed to calculate a depth map and/or analysis information.

One drawback of existing plenoptic cameras is that virtual views have relatively low resolution. In order to capture the four-dimensional light-field, the spatial resolution is decreased significantly in order to increase the resolution of the angular dimensions. In many applications, the output resolution of virtual views may be too low for widespread adoption.

However, depending on the use case, a complete and even sampling in the two angular dimensions may not be required. In many cases, the desired output from the light-field camera may be a combination of high-resolution image data and depth data, often in the form of a depth map or a set of three-dimensional (3D) points (a point cloud). In some use cases, the desired output may be high-resolution depth data.

SUMMARY

Various embodiments of the described system capture light-field images with uneven and/or incomplete angular sampling. Such embodiments may increase spatial and/or output resolution, increase the quality of the depth data, extend the refocusable range of the system, and/or increase the optical baseline. Some of the embodiments utilize novel exit pupil shapes and/or configurations of the microlens array.

BRIEF DESCRIPTION OF THE DRAWINGS

The accompanying drawings illustrate several embodiments. Together with the description, they serve to explain the principles of the embodiments. One skilled in the art will recognize that the particular embodiments illustrated in the drawings are merely exemplary, and are not intended to limit scope.

FIGS. 8A and 8B show exemplary embodiments with exit pupils of high aspect ratios, with nonzero rotational offsets applied between the exit pupils and the microlens arrays and square packing of microlenses, according to certain embodiments.

FIGS. 11A and 11B show exemplary embodiments with the exit pupils of high aspect ratios, with nonzero rotational offsets applied between the exit pupils and the microlens arrays and hexagonal packing of microlenses, according to another embodiment.

FIG. 15 shows the relationship between the exit pupil, microlens array, and disk images when the exit pupil has a high aspect ratio and the microlens array uses lenses of the same aspect ratio using rectangular packing.

FIGS. 20A-20D conceptually show an embodiment that may use a variety of masks to create a light-field camera with different configurable properties, but without changing the microlens array, photosensor, and/or any additional aspect of the objective lens, according to one embodiment.

DETAILED DESCRIPTION

Multiple methods for capturing image and/or video data in a light-field volume and creating virtual views from such data are described. The described embodiments may provide for capturing continuous or nearly continuous light-field data from many or all directions facing away from the capture system, which may enable the generation of virtual views that are more accurate and/or allow viewers greater viewing freedom.

Definitions

For purposes of the description provided herein, the following definitions are used:

Alias-free resolution: a resolution equal to the number of microlenses in the plenoptic microlens array; two-dimensional images created at this resolution from a light field image typically do not contain objectionable processing artifacts.

Aperture stop: The element, be it the rim of a lens or a separate diaphragm, which determines the amount of light reaching the image. In this disclosure, "aperture stop" and "aperture" may be used interchangeably.

Conventional image: an image in which the pixel values are not, collectively or individually, indicative of the angle of incidence at which light is received by a camera.

Depth: a representation of distance between an object and/or corresponding image sample and a microlens array of a camera.

Depth data: any depth or three-dimensional information that may be generated from light field data, which may include, but is not limited to, a depth map, a three-dimensional point cloud, and/or a three-dimensional mesh.

Depth map: a two-dimensional array of depth values, which may be calculated from a light field image. See also "depth data."

Depth-of-field: the range of object distances for which a projected image (especially a virtual view) is sharp to some sufficient degree.

Disk: a region in a light-field image that is illuminated by light passing through a single microlens; may be circular or any other suitable shape.

Figure 17B:
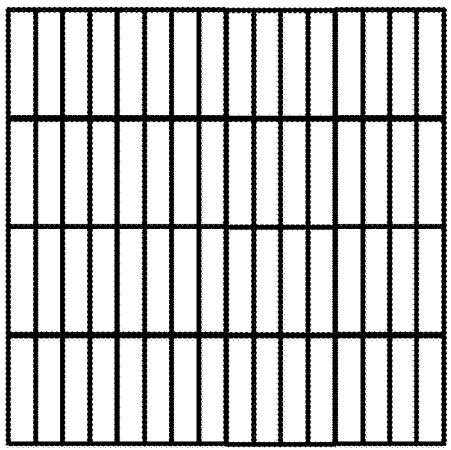
FIGS. 17A-17D show exemplary microlens packing arrangements.
Figure 17D:
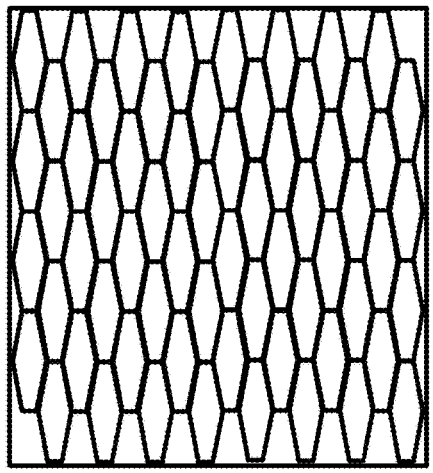

Elliptical packing: a packing pattern that tessellates stretched hexagonal regions onto a stretched hexagonal lattice. In this disclosure, elliptical packing is used to describe the pattern of the microlens elements in the microlens array. An example of this packing is shown in FIG. 17D.

Entrance pupil: in an optical system, the optical image of the physical aperture stop, as seen through the front of the lens system. The geometric size, location, and angular acceptance of the entrance pupil acts as the camera's window of view into the world.

Exit pupil: the exit pupil is the image of the aperture stop as seen from an axial point on the image plane through the interposed lenses, if there are any. In a light-field camera, the image plane is best thought of as the active surface of the microlens array.

F-Number (f/#): focal length divided by entrance pupil size. In this document, the entrance pupil size used in the calculation of f/# is considered to be the width or height for a square, the inner diameter for a hex, or the diameter of a circle. The f/# of the microlens array may be considered to be the lens pitch (equal to the distance between the centers of neighboring lens elements) divided by the distance between the microlens array and the sensor surface.

Hexagonal packing: a packing pattern that tessellates hexagonal regions onto a hexagonal lattice. In this disclosure, hexagonal packing is a specific type of elliptical packing where the hexagon is regular. In this disclosure, hexagonal packing is used to describe the pattern of the microlens elements in the microlens array. An example of this packing is shown in FIG. 17C.

Image: a two-dimensional array of pixel values, or pixels, each specifying a color.

Input device: any device that receives input from a user.

Light-field camera: any camera or device capable of capturing light-field images.

Light-field coordinate, or "four-dimensional light-field coordinate": for a single light-field camera, the four-dimensional coordinate (for example, x, y, u, v) used to index a light-field sample captured by a light-field camera, in which (x, y) may be the spatial coordinate representing the intersection point of a light ray with a microlens array, and (u, v) may be the angular coordinate representing an intersection point of the light ray with an aperture plane.

Light-field data: data indicative of the angle of incidence at which light is received by a camera.

Light-field image: an image that contains a representation of light-field data captured at the sensor, which may be a four-dimensional sample representing information carried by ray bundles received by a single light-field camera.

Main lens, or objective lens: a lens or set of lenses that directs light from a scene toward an image sensor.

Microlens: a small lens, typically one in an array of similar microlenses.

Microlens array: an array of microlenses arranged in a predetermined pattern.

MLA-to-exit pupil rotation: the rotation, in degrees, of the long axis of the exit pupil relative to a primary axis of the microlens array.

MLA-to-sensor rotation: the rotation, in degrees, of a primary axis of the microlens array relative to a primary axis of the photosensor array.

Narrow F/#: For an irregular exit pupil, the f/# based on the short axis of the exit pupil.

Optical baseline: the size of the entrance pupil, as measured across some axis. In this disclosure, the optical baseline refers to the measurement across the long axis, unless otherwise specified. Larger optical baselines equate to greater disparity between the opposing sides of the entrance pupil. The greater disparity may increase the accuracy of certain types of calculations, particularly in the generation of depth data.

Packing, or packing arrangement: the manner in which microlenses are arranged to form a microlens array Plenoptic light-field camera: a type of light-field camera that employs a microlens-based approach in which a plenoptic microlens array is positioned between the objective lens and the photosensor.

Plenoptic microlens array: a microlens array in a plenoptic camera that is used to capture directional information for incoming light rays, with each microlens creating an image of the aperture stop of the objective lens on the surface of the image sensor.

Processor: any processing device capable of processing digital data, which may be a microprocessor, ASIC, FPGA, or other type of processing device.

Ray bundle, ray, or bundle: a set of light rays recorded in aggregate by a single pixel in a photosensor.

Rectangular packing: a packing pattern that tessellates rectangular regions onto a rectangular grid. In this disclosure, rectangular packing is used to describe the pattern of the microlens elements in the microlens array. An example of this packing is shown in FIG. 17B.

Segment, or image segment: a single image of the exit pupil, viewed through a plenoptic microlens, and captured by a region on the surface of an image sensor.

Sensor, photosensor, or image sensor: a light detector in a camera capable of generating images based on light received by the sensor.

Subview: the view or image from an individual view in a light-field camera (a subaperture image in a plenoptic light-field camera, or an image created by a single objective lens in an objective lens array in an array light-field camera).

Super resolution: resolutions higher than the alias-free resolution. Certain image processing techniques can significantly increase the resolution of reconstructed two-dimensional images, but may introduce objectionable visual artifacts.

Virtual view: a two-dimensional image created by processing a light field image based on various parameters. Virtual view types include, but are not limited to, refocused images and extended depth of field (EDOF) images.

Wide F/#: For an irregular exit pupil, the f/# based on the long axis of the exit pupil.

In addition, for ease of nomenclature, the term "camera" is used herein to refer to an image capture device or other data acquisition device. Such a data acquisition device can be any device or system for acquiring, recording, measuring, estimating, determining and/or computing data representative of a scene, including but not limited to two-dimensional image data, three-dimensional image data, and/or light-field data. Such a data acquisition device may include optics, sensors, and image processing electronics for acquiring data representative of a scene, using techniques that are well known in the art. One skilled in the art will recognize that many types of data acquisition devices can be used in connection with the present disclosure, and that the disclosure is not limited to cameras. Thus, the use of the term "camera" herein is intended to be illustrative and exemplary, but should not be considered to limit the scope of the disclosure. Specifically, any use of such term herein should be considered to refer to any suitable device for acquiring image data.

In the following description, several techniques and methods for processing light-field images are described. One skilled in the art will recognize that these various techniques and methods can be performed singly and/or in any suitable combination with one another. Further, many of the configurations and techniques described herein are applicable to conventional imaging as well as light-field imaging. Thus, although the following description focuses on light-field imaging, all of the following systems and methods may additionally or alternatively be used in connection with conventional digital imaging systems. In some cases, the needed modification is as simple as removing the microlens array from the configuration described for light-field imaging to convert the example into a configuration for conventional image capture.

Architecture

Figure 22:
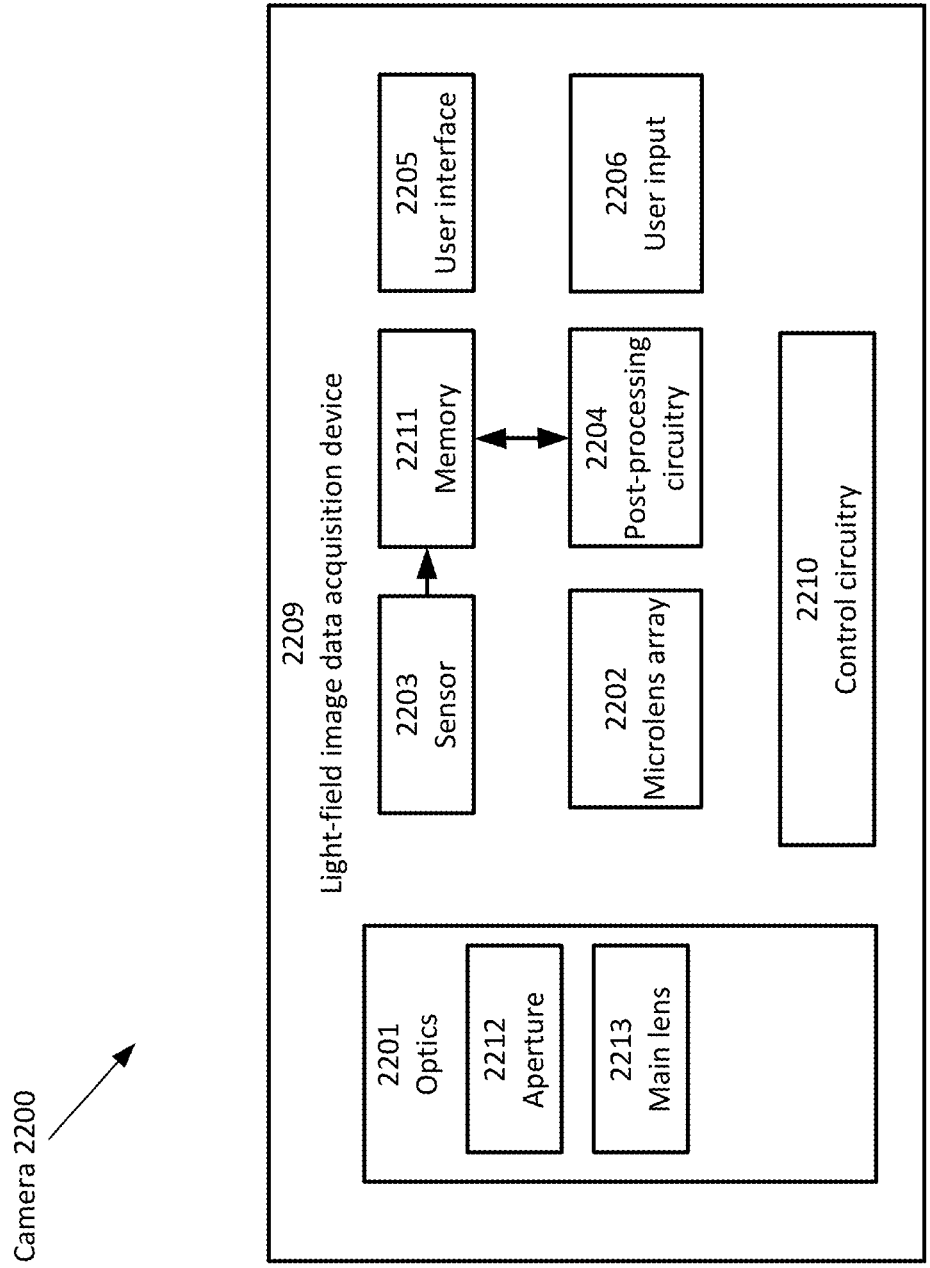
FIG. 22 depicts an example of an architecture for implementing the methods of the present disclosure in a light-field capture device, according to one embodiment.
Figure 23:
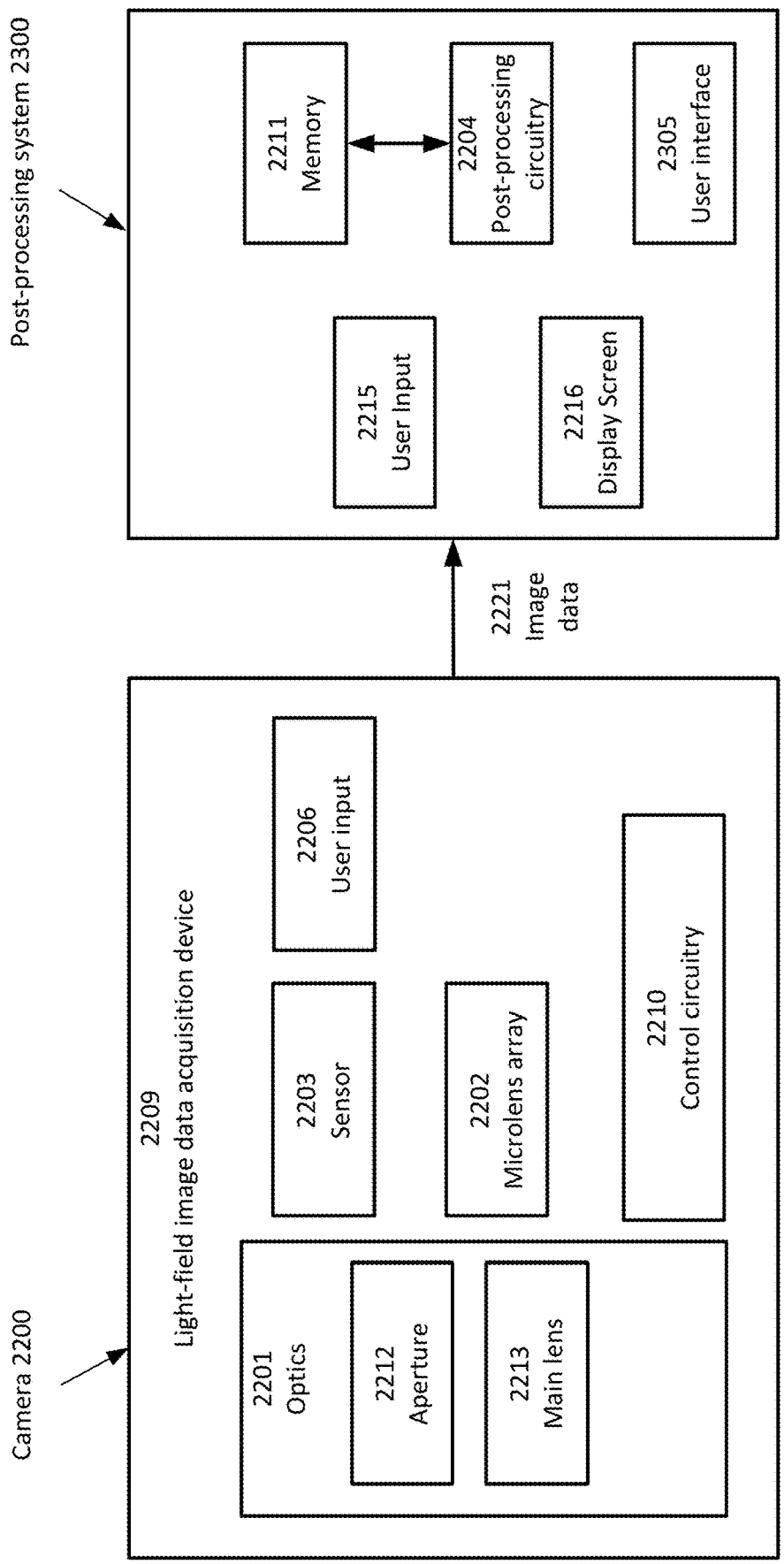
FIG. 23 depicts an example of an architecture for implementing the methods of the present disclosure in a post-processing system communicatively coupled to a light-field capture device, according to one embodiment.

In at least one embodiment, the system and method described herein can be implemented in connection with light-field images captured by light-field capture devices including but not limited to those described in Ng et al., Light-field photography with a hand-held plenoptic capture device, Technical Report CSTR 2005-02, Stanford Computer Science. Referring now to FIG. 22, there is shown a block diagram depicting an architecture for implementing the method of the present disclosure in a light-field capture device such as a camera 2200. Referring now also to FIG. 23, there is shown a block diagram depicting an architecture for implementing the method of the present disclosure in a post-processing system 2300 communicatively coupled to a light-field capture device such as a camera 2200, according to one embodiment. One skilled in the art will recognize that the particular configurations shown in FIGS. 22 and 23 are merely exemplary, and that other architectures are possible for camera 2200. One skilled in the art will further recognize that several of the components shown in the configurations of FIGS. 22 and 23 are optional, and may be omitted or reconfigured.

Figure 24:
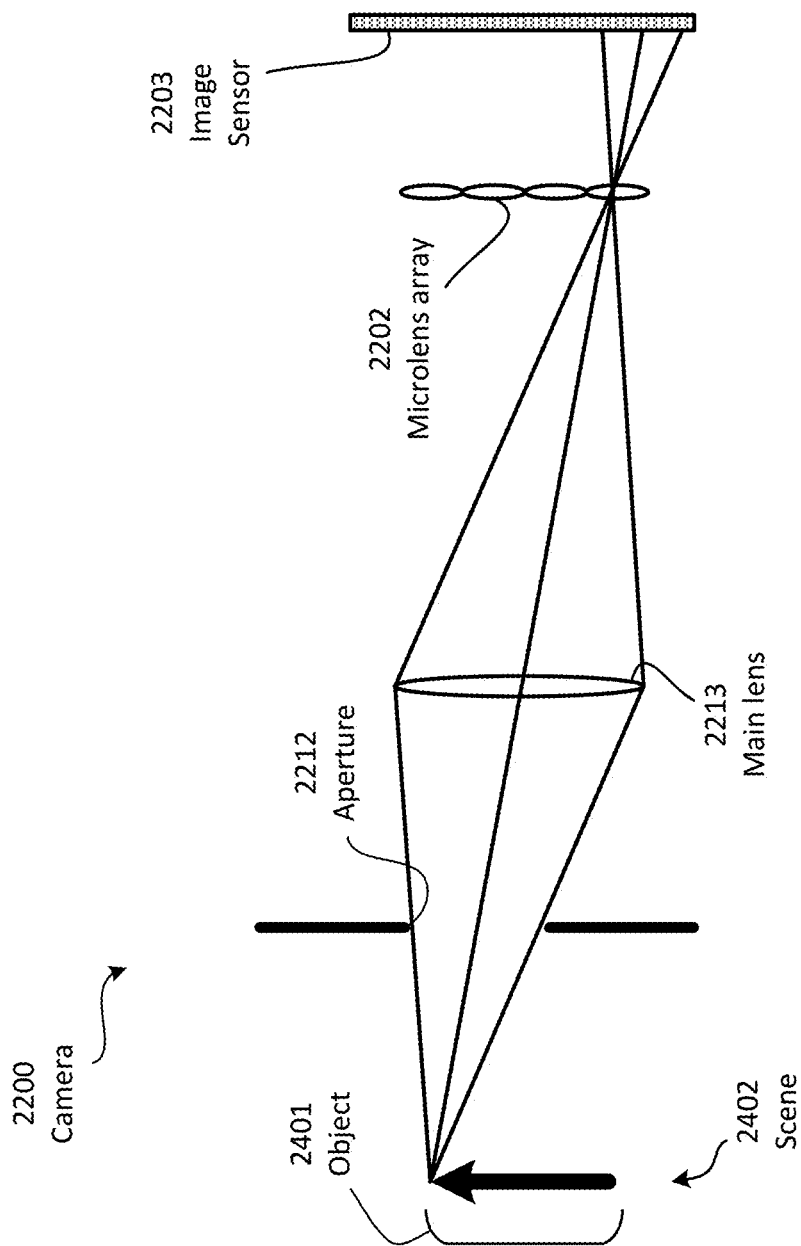
FIG. 24 depicts an example of an architecture for a light-field camera for implementing the methods of the present disclosure according to one embodiment.

In at least one embodiment, camera 2200 may be a light-field camera that includes light-field image data acquisition device 2209 having optics 2201, image sensor 2203 (including a plurality of individual sensors for capturing pixels), and microlens array 2202. Optics 2201 may include, for example, aperture 2212 for allowing a selectable amount of light into camera 2200, and main lens 2213 for focusing light toward microlens array 2202. In at least one embodiment, microlens array 2202 may be disposed and/or incorporated in the optical path of camera 2200 (between main lens 2213 and image sensor 2203) so as to facilitate acquisition, capture, sampling of, recording, and/or obtaining light-field image data via image sensor 2203. Referring now also to FIG. 24, there is shown an example of an architecture for a light-field camera, or camera 2200, for implementing the method of the present disclosure according to one embodiment. The figure is not shown to scale. FIG. 24 shows, in conceptual form, the relationship between aperture 2212, main lens 2213, microlens array 2202, and image sensor 2203, as such components interact to capture light-field data for one or more objects, represented by an object 2401, which may be part of a scene 2402.

In at least one embodiment, camera 2200 may also include a user interface 2205 for allowing a user to provide input for controlling the operation of camera 2200 for capturing, acquiring, storing, and/or processing image data. The user interface 2205 may receive user input from the user via an input device 2206, which may include any one or more user input mechanisms known in the art. For example, the input device 2206 may include one or more buttons, switches, touch screens, gesture interpretation devices, pointing devices, and/or the like.

Similarly, in at least one embodiment, post-processing system 2300 may include a user interface 2305 that allows the user to control operation of the system.

In at least one embodiment, camera 2200 may also include control circuitry 2210 for facilitating acquisition, sampling, recording, and/or obtaining light-field image data. The control circuitry 2210 may, in particular, be used to switch image capture configurations in response to receipt of the corresponding user input. For example, control circuitry 2210 may manage and/or control (automatically or in response to user input) the acquisition timing, rate of acquisition, sampling, capturing, recording, and/or obtaining of light-field image data.

In at least one embodiment, camera 2200 may include memory 2211 for storing image data, such as output by image sensor 2203. Such memory 2211 can include external and/or internal memory. In at least one embodiment, memory 2211 can be provided at a separate device and/or location from camera 2200.

For example, when camera 2200 is in a light-field image capture configuration, camera 2200 may store raw light-field image data, as output by image sensor 2203, and/or a representation thereof, such as a compressed image data file. In addition, when camera 2200 is in a conventional image capture configuration, camera 2200 may store conventional image data, which may also be stored as raw, processed, and/or compressed output by the image sensor 2203.

In at least one embodiment, captured image data is provided to post-processing circuitry 2204. The post-processing circuitry 2204 may be disposed in or integrated into light-field image data acquisition device 2209, as shown in FIG. 22, or it may be in a separate component external to light-field image data acquisition device 2209, as shown in FIG. 23. Such separate component may be local or remote with respect to light-field image data acquisition device 2209. Any suitable wired or wireless protocol can be used for transmitting image data 2221 to circuitry 2204; for example, the camera 2200 can transmit image data 2221 and/or other data via the Internet, a cellular data network, a Wi-Fi network, a Bluetooth communication protocol, and/or any other suitable means.

Such a separate component may include any of a wide variety of computing devices, including but not limited to computers, smartphones, tablets, cameras, and/or any other device that processes digital information. Such a separate component may include additional features such as a user input 2215 and/or a display screen 2216. If desired, light-field image data may be displayed for the user on the display screen 2216.

Overview

Light-field images often include a plurality of projections (which may be circular or of other shapes) of aperture 2212 of camera 2200, each projection taken from a different vantage point on the camera's focal plane. The light-field image may be captured on image sensor 2203. The interposition of microlens array 2202 between main lens 2213 and image sensor 2203 causes images of aperture 2212 to be formed on image sensor 2203, each microlens in microlens array 2202 projecting a small image of main-lens aperture 2212 onto image sensor 2203. These aperture-shaped projections are referred to herein as disks, although they need not be circular in shape. The term "disk" is not intended to be limited to a circular region, but can refer to a region of any shape.

Figure 21:
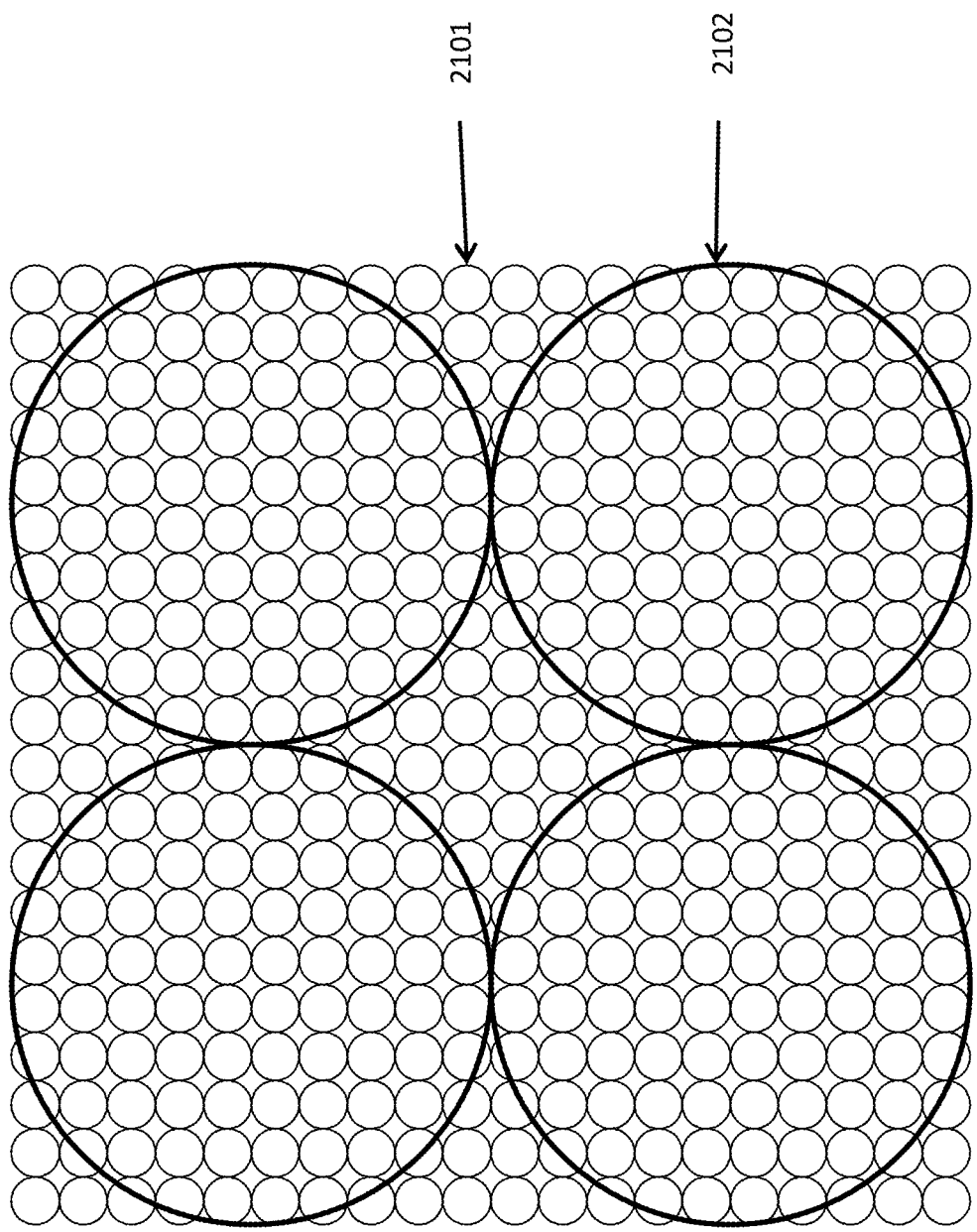
FIG. 21 depicts a portion of a light-field image.

Light-field images include four dimensions of information describing light rays impinging on the focal plane of camera 2200 (or other capture device). Two spatial dimensions (herein referred to as x and y) are represented by the disks themselves. For example, the spatial resolution of a light-field image with 120,000 disks, arranged in a Cartesian pattern 400 wide and 300 high, is 400×300. Two angular dimensions (herein referred to as u and v) are represented as the pixels within an individual disk. For example, the angular resolution of a light-field image with 100 pixels within each disk, arranged as a 10×10 Cartesian pattern, is 10×10. This light-field image has a 4-D (x,y,u,v) resolution of (400,300,10,10). Referring now to FIG. 21, there is shown an example of a 2-disk by 2-disk portion of such a light-field image, including depictions of disks 2102 and individual pixels 2101; for illustrative purposes, each disk 2102 is ten pixels 2101 across.

In at least one embodiment, the 4-D light-field representation may be reduced to a 2-D image through a process of projection and reconstruction. As described in more detail in related U.S. Utility application Ser. No. 13/774,971 for "Compensating for Variation in Microlens Position During Light-Field Image Processing,", filed Feb. 22, 2013 and issued on Sep. 9, 2014 as U.S. Pat. No. 8,831,377, the disclosure of which is incorporated herein by reference in its entirety, a virtual surface of projection may be introduced, and the intersections of representative rays with the virtual surface can be computed. The color of each representative ray may be taken to be equal to the color of its corresponding pixel.

Problem Description

One drawback of many existing plenoptic cameras is relatively low output resolution. In many such cameras, in order to capture the four-dimensional light-field, the spatial resolution is decreased very significantly in order to increase the resolution of the angular dimensions.

For example, consider the case of a photosensor with a 4000×3000 pixel array (12 megapixels). Using a standard optical configuration (a two-dimensional camera), the spatial output resolution is the full 12 megapixels. If the same sensor is used in a light-field camera, the configuration may include 10 angular samples in each of u and v. In this configuration, the light-field sensor would sample at 400× 300×10×10, using the full 12 megapixels. The alias-free spatial resolution of virtual views would be 400×300, a very low resolution. As higher resolution is desired for many use cases, including artistic photography and industrial imaging, it is desirable to find ways to increase the output resolution of the system while preserving some or all of the other benefits of light-field images.

Figure 1:
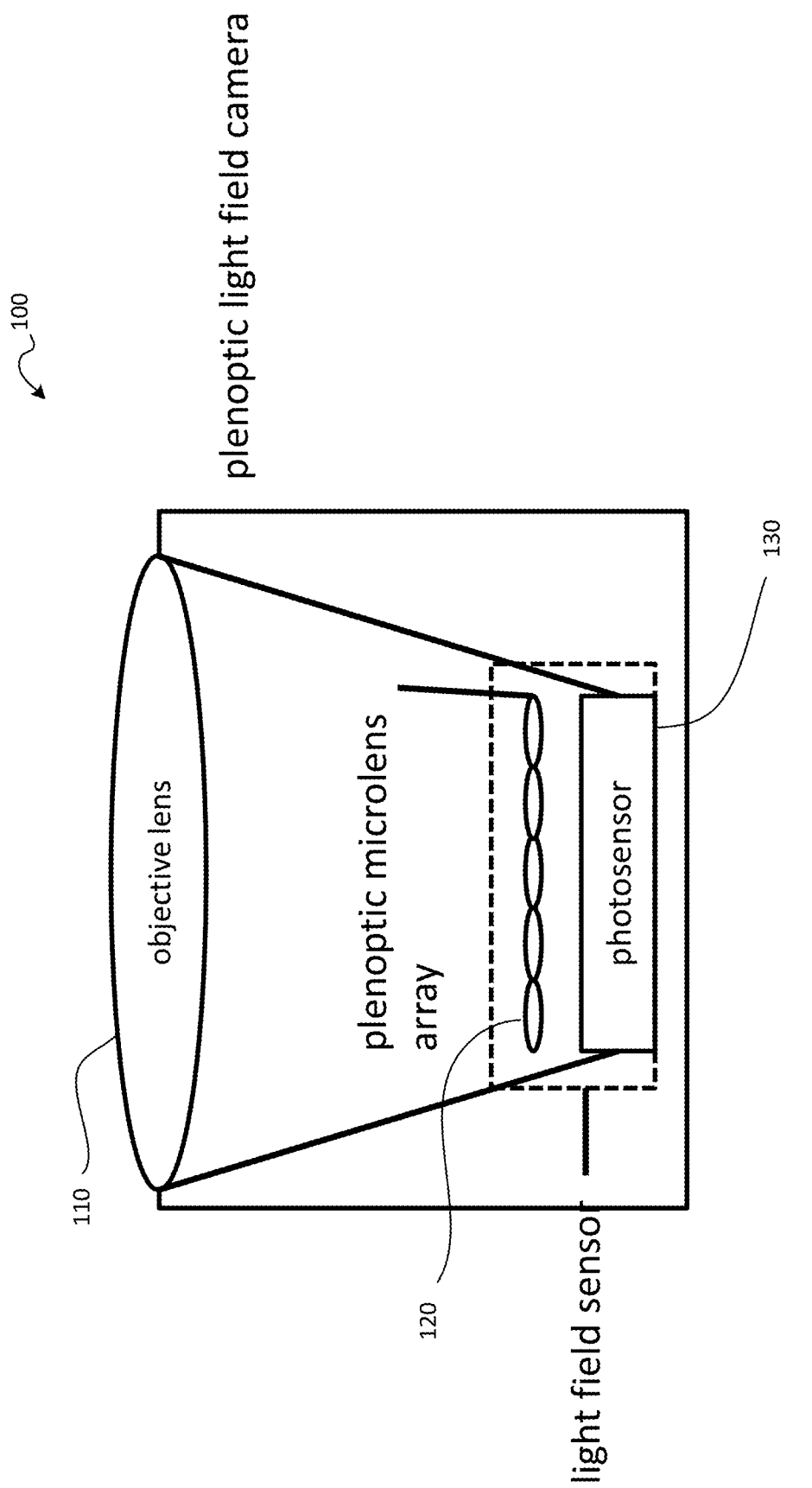
FIG. 1 is a diagram of a plenoptic light-field camera, according to one embodiment.

Referring to FIG. 1, a plenoptic light-field camera 100 may capture a light-field using an objective lens 110, plenoptic microlens array 120, and photosensor 130. The objective lens 110 may be positioned to receive light through an aperture (not shown) having an exit pupil. Each microlens in the plenoptic microlens array 120 may create an image of the aperture on the surface of the photosensor 130. By capturing data regarding the vector at which light rays are received by the photosensor 130, the plenoptic light-field camera 100 may facilitate the generation of extended depth-of-field images and other processed images based on the light-field data captured by the plenoptic light-field camera 100. FIG. 1 is a simplified representation for illustrative purposes; light-field camera 100 may include additional components and elements not depicted in FIG. 1.

Figure 2:
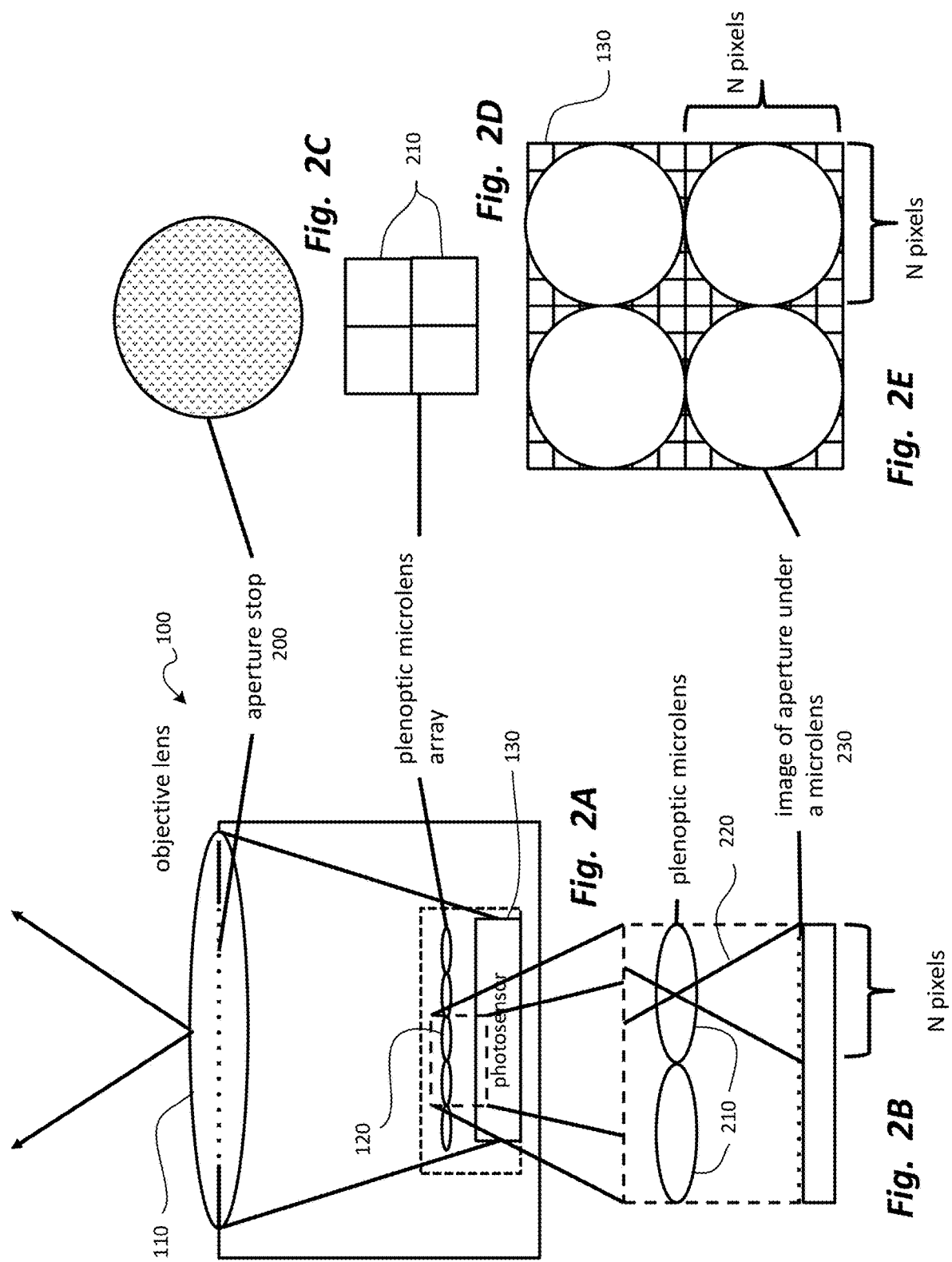
FIGS. 2A-2E are diagrams of various aspects of the plenoptic light-field camera of FIG. 1.

FIGS. 2A through 2E are diagrams of various aspects of the plenoptic light-field camera 100 of FIG. 1. FIG. 2A shows a cross-sectional view of the plenoptic light-field camera 100, including an aperture stop 200 in the objective lens 110. FIG. 2B shows a cross-sectional illustration of a plenoptic microlens 210 of the plenoptic microlens array 120, central rays 220 passing through the plenoptic microlens 210, and the disk image 230 generated on the surface of the photosensor 130. FIG. 2C is a diagram of the aperture stop 200 from a top-down view. FIG. 2D is a top down view of a 2×2 set of plenoptic microlenses 210 with square packing. FIG. 2E is a top down view of the disk images 230 generated on the surface of the photosensor 130.

Figure 3:
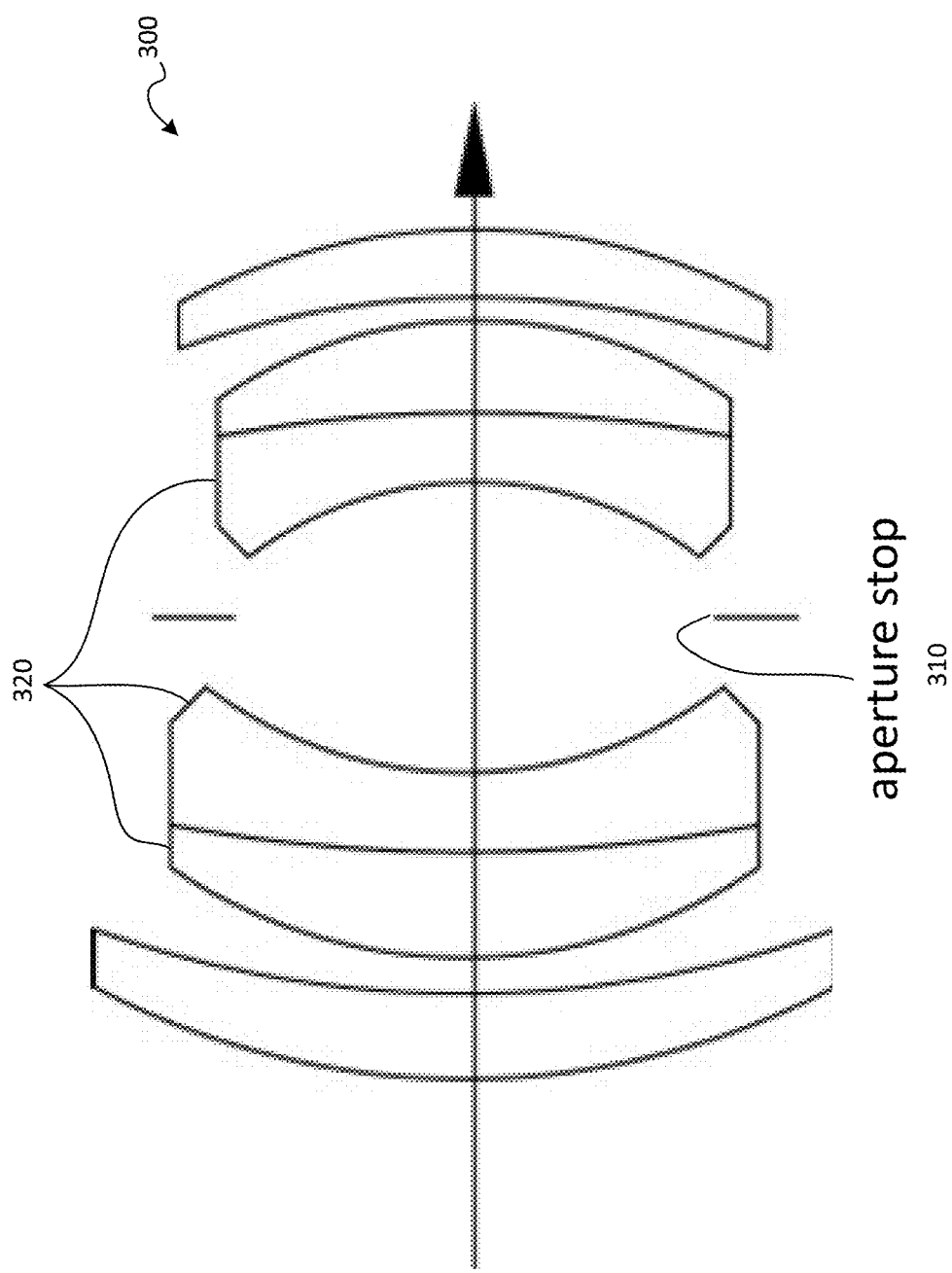
FIG. 3 shows a cross-sectional view of a double Gauss lens design, including an aperture stop, according to one embodiment.

FIG. 3 shows a cross-sectional view of a double Gauss lens design 300, including an aperture stop 310. The double Gauss lens design 300 is one of many lens types that may be suitable for use in light-field imaging. As shown, the double Gauss lens design 300 may have a plurality of lens elements 320.

Figure 17A:
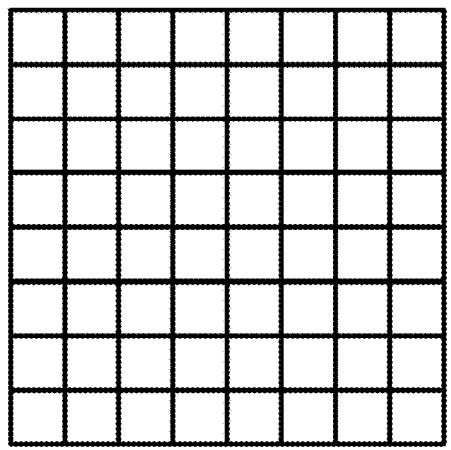
Figure 17C:
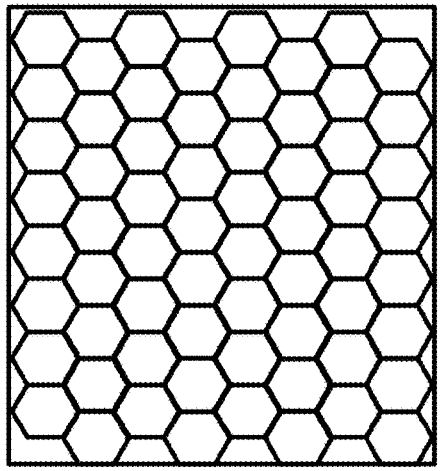

FIGS. 17A through 17D show exemplary lens packing arrangements, according to certain embodiments. FIG. 17A shows a square packing arrangement 1700. FIG. 17B shows a rectangular packing arrangement 1720. FIG. 17C shows a hexagonal packing arrangement 1740. FIG. 17D shows an elliptical packing arrangement 1760.

Figure 4:
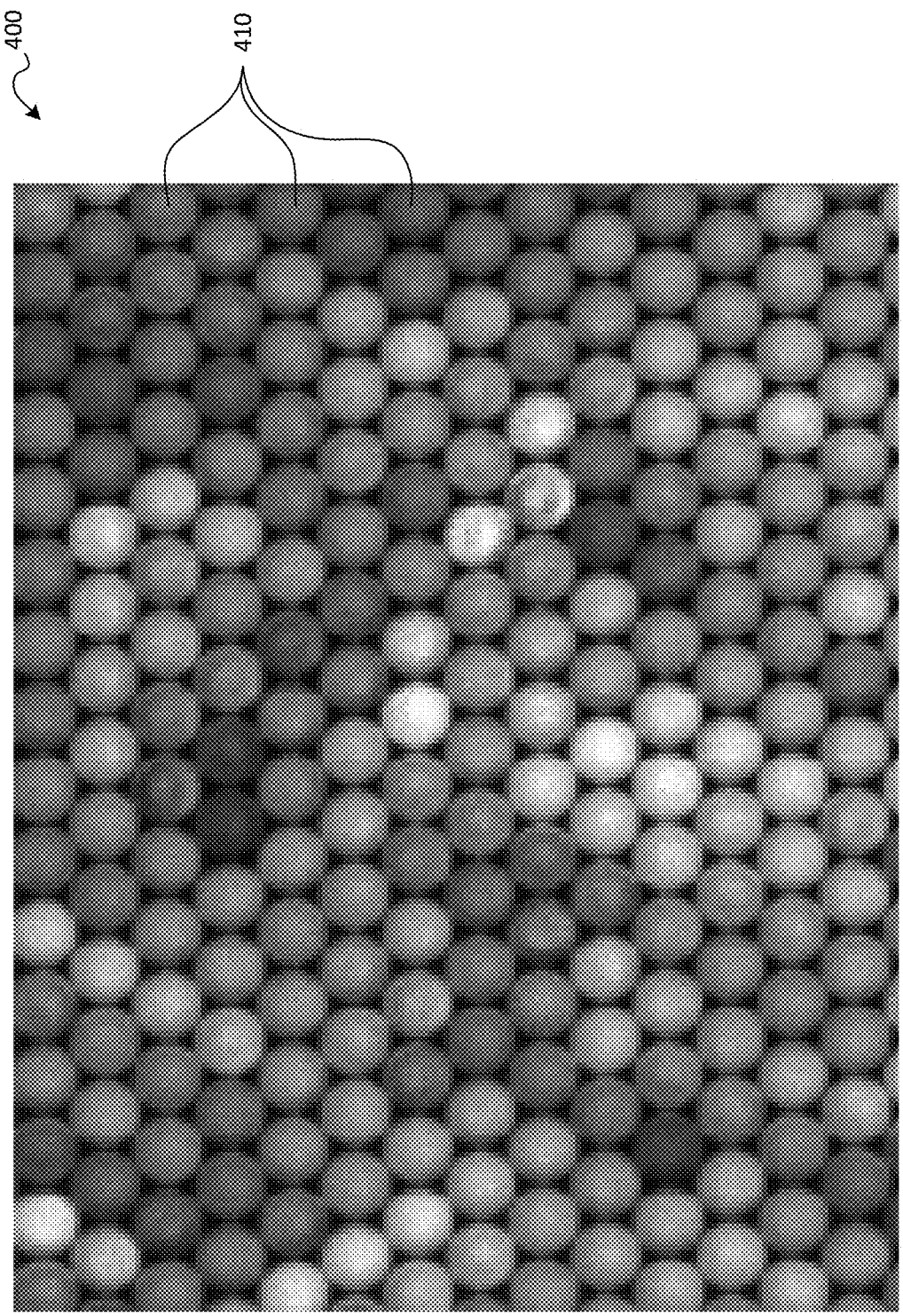
FIG. 4 shows a portion of an image captured with a microlens array paired with a circular aperture.
Figure 5:
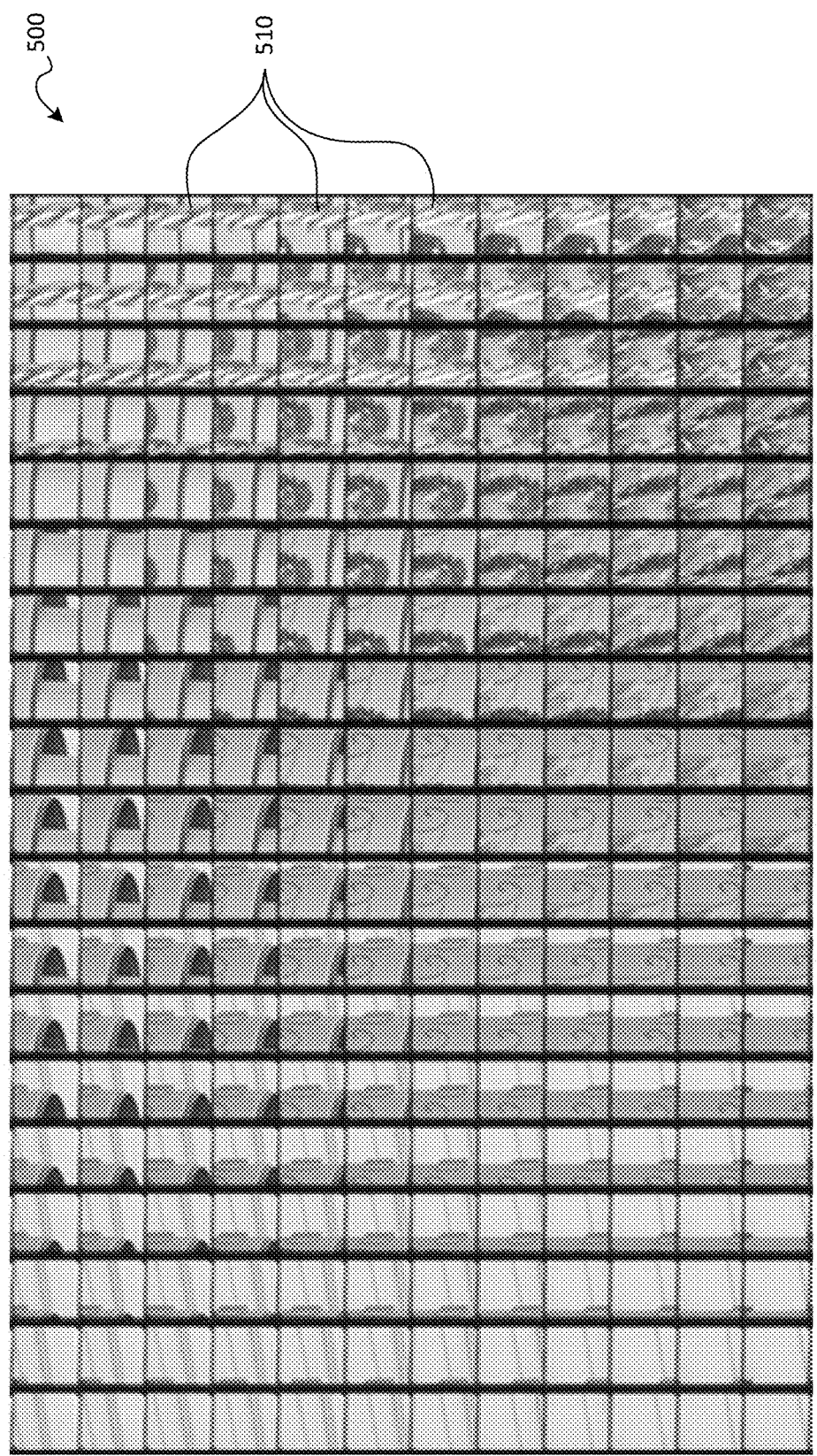
FIG. 5 shows a portion of an image captured with a microlens array paired with a rectangular or even square aperture.
Figure 6:
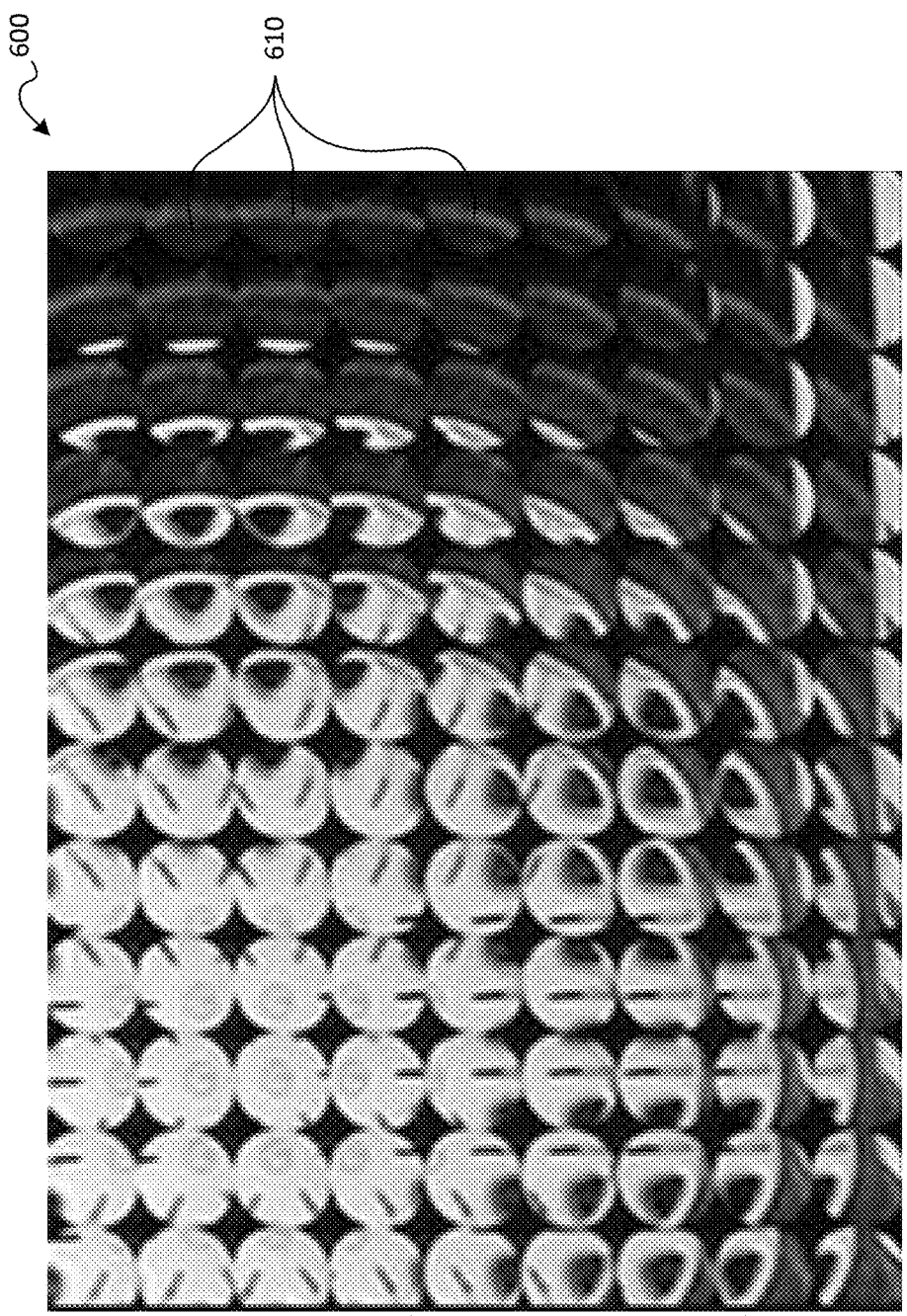
FIG. 6 shows a portion of an image captured with a microlens array paired with a generally circular aperture.

FIGS. 4, 5 and 6 show exemplary image data captured by a light-field camera, using different aperture shapes and microlens array packing. Various combinations of aperture shapes and microlens array packing layouts may be used.

Specifically, FIG. 4 is a portion of an image 400 captured with a microlens array paired with a circular aperture. The microlenses 410 of the microlens array may be generally circular in shape to match the shape of the aperture, and may be packed such that each pair of adjacent rows of the microlenses 410 is offset from each other by 50% of the diameter of a microlens 410. This packing may enable the protruding portions of each microlens 410 to protrude into the empty areas between the adjoining microlenses 410 of each adjacent row. The result may be that each microlens 410 has six immediate neighbors arranged around the microlens 410 in a generally hexagonal formation. This packing layout may be referred to as "hexagonal packing," as in the hexagonal packing arrangement 1740 of FIG. 17C.

FIG. 5 is a portion of an image 500 captured with a microlens array paired with a rectangular or even square aperture. The microlenses 510 of the microlens array may be generally square in shape to match the shape of the aperture, and may be packed in a generally rectangular grid, with each microlens 510 aligned with its horizontal and vertical neighbors. This packing layout may be referred to as "square packing," as in the square packing arrangement 1700 of FIG. 17A.

FIG. 6 is a portion of an image 600 captured with a microlens array paired with a generally circular aperture. The microlenses 610 of the microlens array may be generally circular in shape to match the shape of the aperture, and may be packed in a generally rectangular grid, with each microlens 610 aligned with its horizontal and vertical neighbors. Thus, square packing may be used for the microlenses 610 as in the image 500, as in the square packing arrangement 1700 of FIG. 17A. The result may be that, in the image 600, there is more interstitial "black" space than is present in the image 400. However, the horizontal and vertical alignment of the microlenses 610 may provide some computational advantages as the image 600 is processed.

Applying specialized processing techniques, such as super resolution, may increase the output resolution of the virtual views. However, while super resolution techniques may be used to increase the output resolution, the results may still have inadequate resolution. In addition, the super resolution techniques often introduce objectionable visual artifacts. In particular, many existing super resolution techniques are dependent on the quality of the depth map. Errors in the depth map calculated from the light-field data may result in artifacts.

Another method to increase the output resolution of a plenoptic camera is to reduce the number of pixels under each microlens. In the 12-megapixel example above, the device may sample at 800×600×5×5. In this case, the spatial resolution may be increased, but the angular resolution is decreased. Reducing the angular sampling may also cause the refocusable range and other benefits of the light-field image to be reduced.

An alternative method to increase the output resolution is to increase the pixel count of the sensor. For example, a 48-megapixel sensor may be used instead of a 12-megapixel sensor. In that case, the 4D sampling resolution may be 800×600×10×10, if all new resolution is allocated to the spatial dimensions. Alternatively, new resolution may be evenly allocated approximately evenly across all four dimensions with a sampling resolution of 572×428×14×14. While increasing the pixel count improves output resolution, such an approach significantly increases the requirements of the photosensor, readout, storage, processing and other aspects of the total image processing system. Further, for a given physical area, there are practical limits (including optical aspects such as diffraction) to the maximum number of pixels that may be effectively used.

Novel Exit Pupil Shapes and Microlens Configurations

Various embodiments of the systems and methods described herein capture light-field images with uneven and/or incomplete angular sampling. Such embodiments may increase spatial and/or output resolution, increase the quality of the depth data, extend the refocusable range of the system, and/or increase the optical baseline. Some of the embodiments utilize novel exit pupil shapes and/or configurations of the microlens array. These various approaches can be implemented singly or in any suitable combination with one another.

Exit Pupils with High Aspect Ratio

In at least one embodiment, the exit pupil contains a long axis and a short axis. Embodiments of this type may have relatively higher angular sampling in one dimension than in the other, orthogonal dimension.

Embodiments of this type may be advantageous when depth data and/or high-resolution virtual view data are desired as output. Generating depth data from light-field data is dependent on the algorithm(s) and processing selected, but in general a larger optical baseline and/or higher density angular sampling provides better results. Depth data may be used to apply effects, modify the image, generate three-dimensional models of objects in the scene, and/or the like.

Figure 13B:
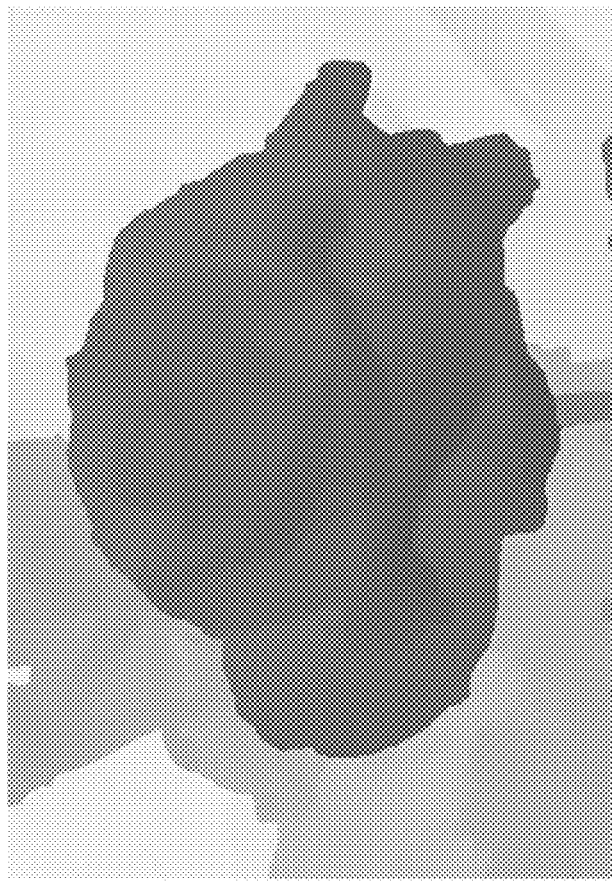
FIGS. 13A and 13B show a virtual view in the form of an image, and depth data in the form of a depth map corresponding to the image, respectively, according to one embodiment.
Figure 13A:

FIGS. 13A and 13B respectively show a virtual view in the form of an image 1300 and depth data in the form of a depth map 1350. The image 1300 may be projected from light-field data. The depth map 1350 may be a grayscale image as shown, and may be generated by processing the light-field data. In the depth map 1350, dark portions of the image represent surfaces that are closer to the camera, while light portions indicate surfaces further from the camera.

A standard plenoptic camera system has an alias-free output resolution approximately equal to photo_sensor_pixel_count/$N^2$. In the limit, an embodiment with an exit pupil with a high aspect ratio may have angular sampling of Nu*Nv, where Nv=1. In that case, the alias-free output resolution may become photo_sensor_pixel_count/Nu, an inversely linear relationship with Nu, which may be far preferable to the standard plenoptic relationship that is inversely quadratic with N. As a result, given the same image sensor, configurations may be made that have higher angular sampling (along one axis) with the same alias-free output resolution, higher alias-free output resolution with the same angular sampling, or a combination of higher alias-free output resolution and higher angular sampling.

In at least one embodiment, the light-field camera may use cylindrical lenses in the microlens array. One example of such an embodiment is shown in FIG. 16.

Figure 16:
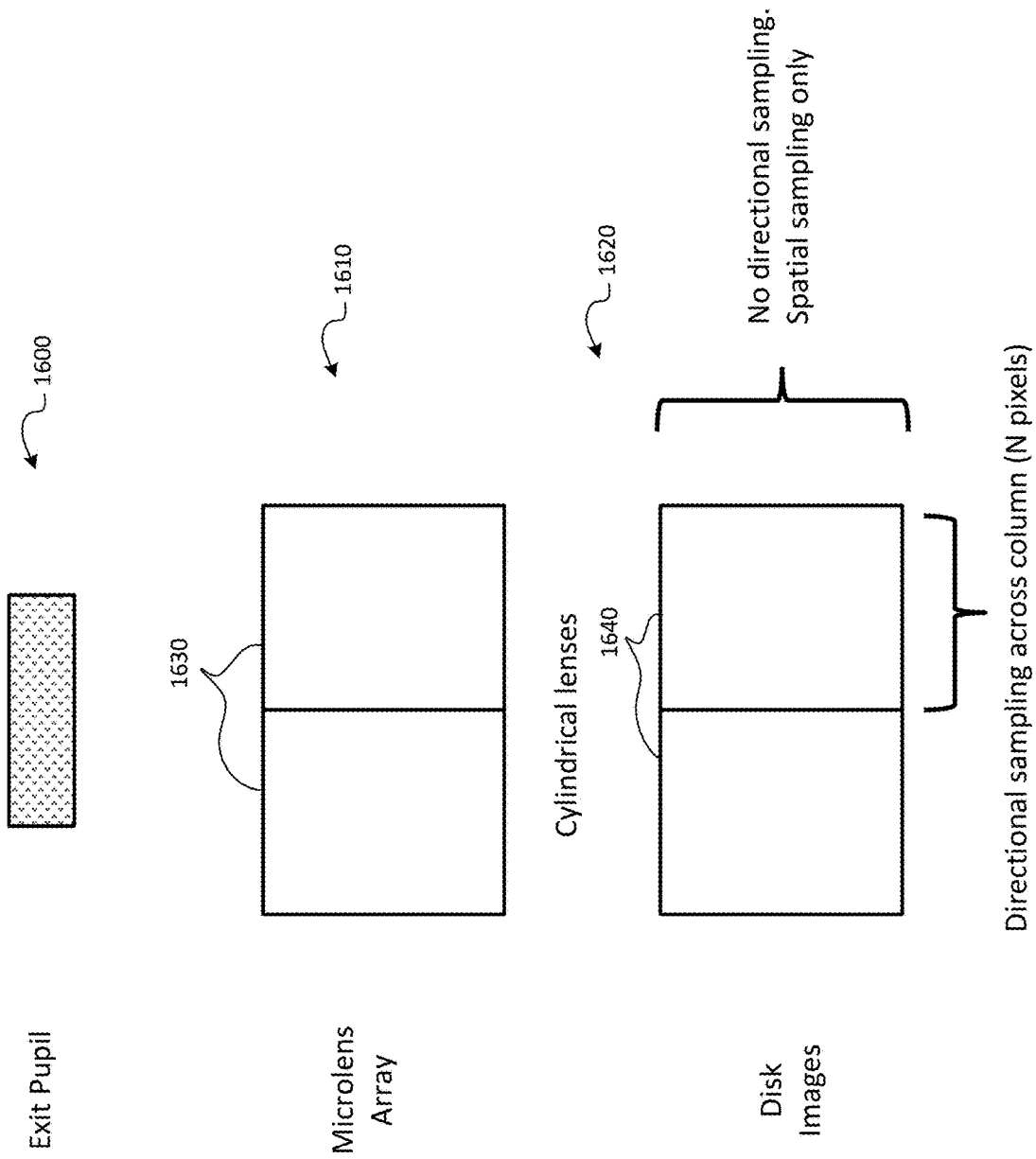
FIG. 16 shows the relationship between the exit pupil, microlens array, and disk images when the exit pupil has a high aspect ratio and the microlens array uses cylindrical lenses, according to one embodiment.

Referring to FIG. 16, an exemplary exit pupil 1600 is shown, along with a portion of a microlens array 1610 and a portion of a disk image 1620. The exit pupil 1600 may have a high aspect ratio. Specifically, the exit pupil 1600 may be much wider along a long axis than it is tall along a short axis perpendicular to the long axis. In some embodiments, the aspect ratio of the exit pupil may be N:1.

The microlens array 1610 may be a one-dimensional array of cylindrical lenses 1630. The focal length of the cylindrical lenses 1630 may be approximately equal to the separation between the microlens array and the photosensor (not shown). The focal length of the microlens array 1610 divided by the width of a cylindrical lens 1630 may also be substantially equivalent to the Wide F/# of the objective lens (not shown). The short axis of the cylindrical lenses 1630 may be parallel to the long axis of the exit pupil 1600, and this case may be considered to have an MLA-to-exit pupil rotation of 0°.

The disk image 1620 may have a plurality of segments 1640, each of which has a width substantially equal to N pixels. In this configuration, the four-dimensional sampling rate on a photosensor of W×H pixels may be W/N×H×N×1. This type of camera may be considered a three-dimensional light-field camera, as one of the angular dimensions contains only a single sample. Notably, one skilled in the art will recognize that while the microlens array 1610 and the exit pupil 1600 may be aligned with each other to provide a 0° rotational offset between the microlens array 1610 and the exit pupil 1600, the sensor (not shown) need not be constrained to a 0° relative to the microlens array 1610 and/or the exit pupil 1600.

In at least one embodiment in which cylindrical lenses are used in the microlens array, an anamorphic lens and/or sensor with a high aspect ratio may be used. In one particular embodiment, the aperture stop may be physically circular, square, or otherwise have substantially equal width and height. The anamorphic lens may be used to stretch the aperture and image on the sensor, for example by a factor of N. In this case, the exit pupil, or the view of the aperture stop as seen from the sensor, may have a long axis and a short axis. The cylindrical microlens array may be designed so that each disk image is N pixels wide. Further, an ultrawide sensor may be used. For example, if an aspect ratio of W:H is desired and the anamorphic lens stretches the image horizontally by a factor of N, then the aspect ratio of the sensor may be WN:H. Notably, the reconstruction processing may reverse the stretching introduced by the anamorphic lens and output virtual views with an aspect ratio of W:H.

In some embodiments, the microlens array may use rectangular or elliptical packing of the microlens elements, and may have an MLA-to-exit pupil rotation of 0°. This is shown in FIG. 15, which is a conceptual illustration using a rectangular packing of microlens elements.

Referring to FIG. 15, an exemplary exit pupil 1500 is shown, along with a portion of a microlens array 1510 and a portion of a disk image 1520. The exit pupil 1500 may have a high aspect ratio, like the exit pupil 1600 of FIG. 16. Specifically, the exit pupil 1500, the microlenses 1530 of the microlens array 1510, and the segments 1540 of the disk image 1520 may all have an aspect ratio of $c^2$:1.

In similar embodiments (not shown), the aperture may be physically circular, square or otherwise have substantially equal width and height, while the microlens array and disk image segments may have an aspect ratio of $c^2$:1. The anamorphic lens may be used to stretch the aperture and image on the sensor, for example by a factor of $c^2$. In such cases, the exit pupil, or the view of the aperture stop as seen from the sensor, may have a long axis and a short axis. In at least one embodiment, a wide sensor may be used such that the virtual views will have a desired aspect ratio that may be different than the aspect ratio of the two-dimensional image data captured on the photosensor. One skilled in the art will recognize that, in any of the embodiments described herein, the system may also be implemented using vertical configurations or any other orientation.

Figures 7A, 7B, 7C:
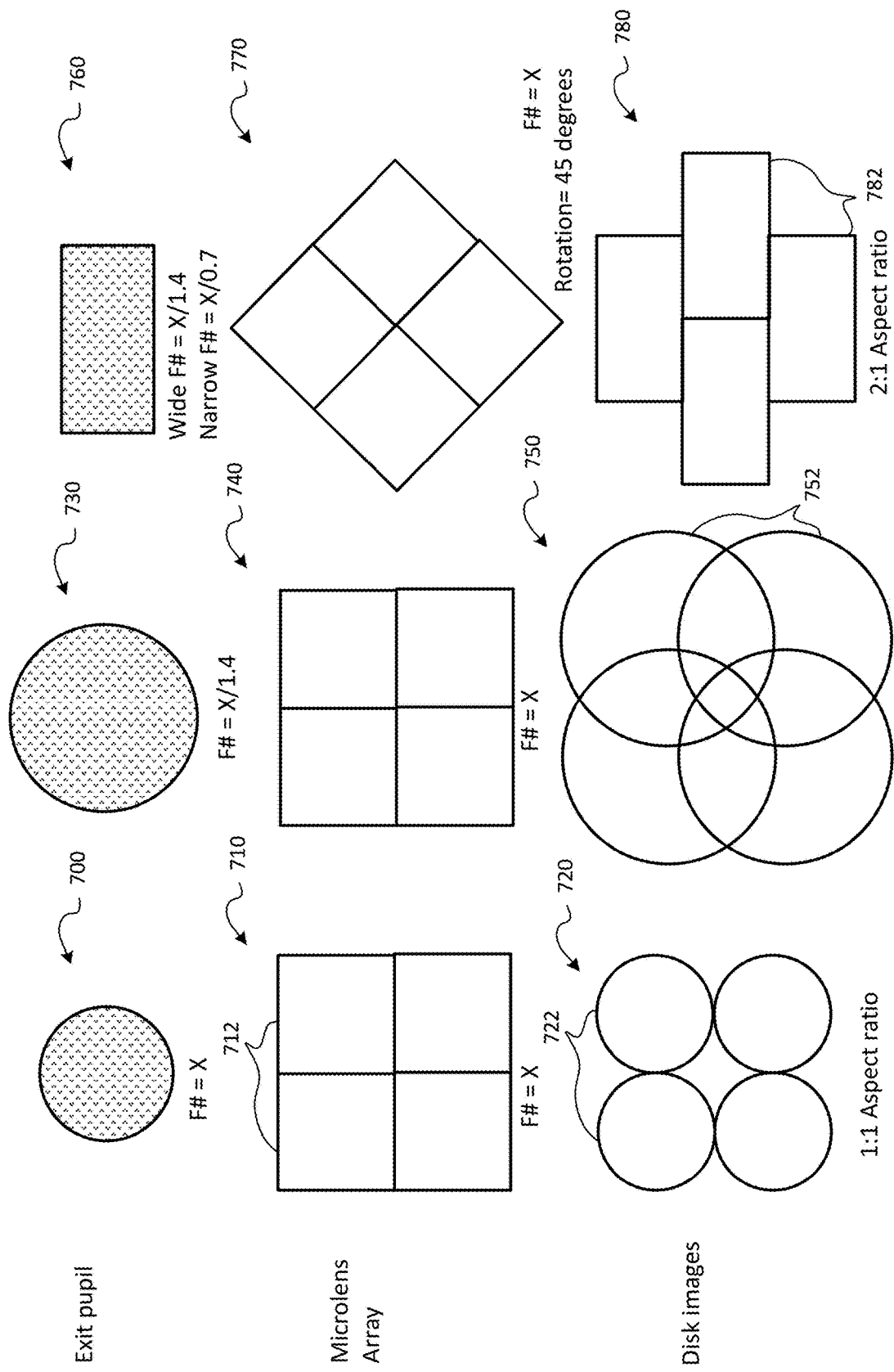
FIGS. 7A-7C show the relationships between the exit pupil, microlens array, and disk images, according to certain embodiments.

In some embodiments, the exit pupil may have a long axis and a short axis, the plenoptic microlens array may use square packing or hexagonal packing, and the MLA-to-exit pupil rotation may be set to a specific angle so that the disk images tessellate without overlapping. FIGS. 7A-7C show the relationships between the exit pupil, microlens array, and disk images in such embodiments.

FIG. 7A shows one typical configuration for a light-field camera. The exit pupil 700 is circular, the microlenses 712 of the microlens array 710 are arranged in a square packing, and the f/# of the main lens is equal or nearly equal to the f/# of the microlens array. In this configuration, the segments 722 of the disk image 720 are tightly packed circles in a square lattice.

FIG. 7B shows the effect of increasing the size of an exit pupil 730 while keeping other aspects unchanged. The f/# of the main lens (not shown) is lower than the f/# of the microlens array 740. In this case, the segments 752 of the disk image 750 show significant overlap, and the image data may not be usable.

FIG. 7C shows an embodiment of the invention. The exit pupil 760 is as wide as shown in FIG. 7B, but is only half as tall. The microlens array 770 is rotated 45°, but otherwise unchanged. In this configuration, the segments 782 of the disk image 780 do not overlap and have an aspect ratio of 2:1.

Figures 10A, 10B, 10C:
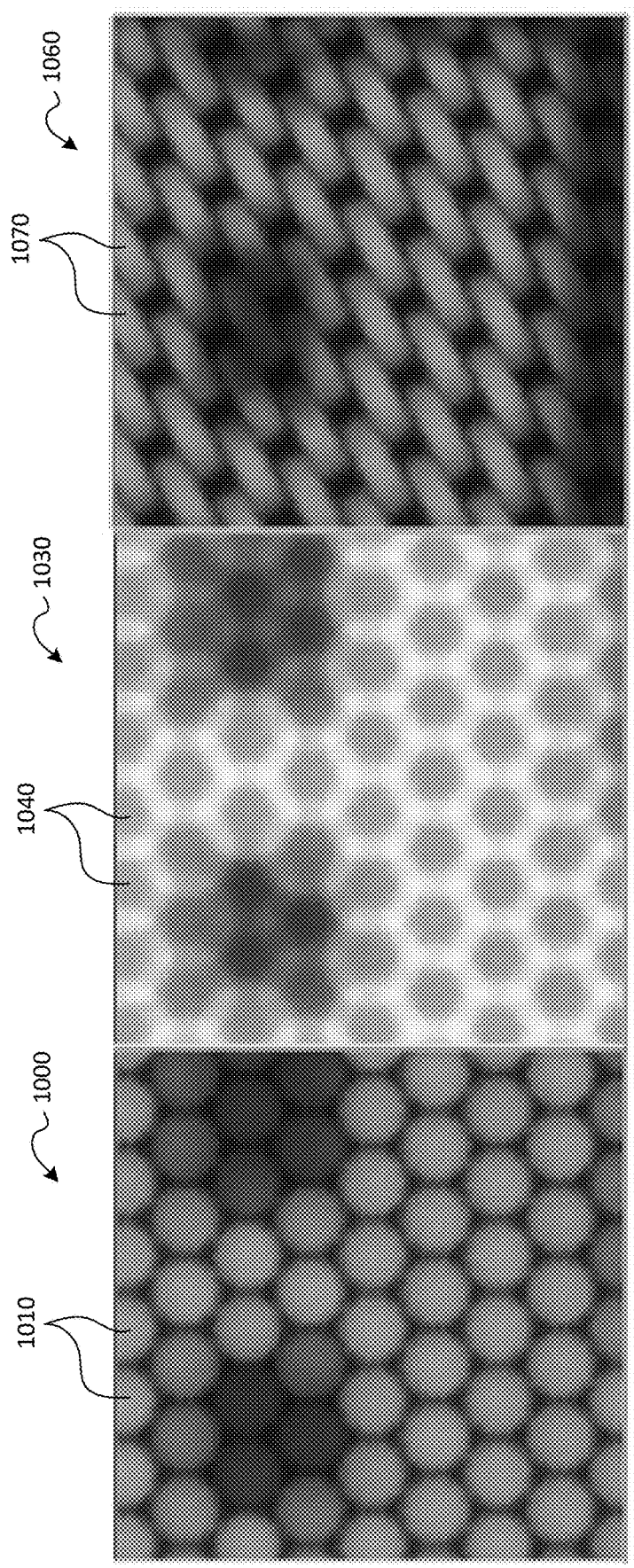
FIGS. 10A, 10B and 10C show captured disk images using a hexagonally packed microlens array and three different exit pupil configurations, according to certain embodiments.

In a similar embodiment, FIGS. 10A, 10B and 10C show captured images 1000, 1030, and 1060, respectively, using a hexagonally packed microlens array and three different exit pupil configurations. In the image 1000 of FIG. 10A, the f/# of the main lens is approximately equal to the f/# of the microlens array and the exit pupil shape is circular. The disk images 1010 are circular and almost touching. In the image 1030 of FIG. 10B, the f/# of the main lens is smaller than the f/# of the microlens array, and the exit pupil is circular. The disk images 1040 are circular and overlap. The overlapping regions are the brightest portions of the image. In FIG. 10C, the Wide F/# is smaller than the f/# of the microlens array, the Narrow F/# is larger than the f/# of the microlens array, and the long axis of the exit pupil is rotated relative to the hexagonal axes. The disk images 1070 appear rotated and elongated.

Notably, in these embodiments, the sampling along one angular dimension is greater than in the other angular dimension, but the reduction in spatial resolution may be equal across both spatial dimensions, relative to the sensor. As an example, the exemplary 4000×3000 pixel sensor, in a standard light-field configuration with N=10, will have a spatial resolution of 4000/N=400 in one dimension and 3000/N=300 in the other spatial dimension. Using rectangular or elliptical microlens packing, with matched exit pupil shape, may result in a similar tradeoff. If Nx, the number of pixels in a disk image along the x-axis, is 20, and Ny, the number of pixels in a disk image along the y-axis, is 5, then the spatial resolution may be 4000/Nx=200 by 3000/Ny=600. However, in the example shown in FIG. 7C, the structure of the microlens array 770 remains square, and the spatial resolution may remain 400×300 for the exemplary sensor even though Nx is substantially larger than Ny.

In at least one embodiment, the microlens array uses square packing. At specific MLA-to-exit pupil rotations, specific aspect ratios may be used for the exit pupil and disk images. With square microlens array packing, the following equations describe the system for integral values of k.

angle=90−atan($k$)

width=SQRT($k$^2+1)

height=1/$W$ aspect_ratio=width:height where
"k" is a the sequence number
"angle" is the MLA-Exit Pupil rotation, in degrees
"width" is the width of the disk image, relative to the width at k=0
"height" is the height of the disk image, relative to the height at k=0
"aspect_ratio" is the aspect ratio of disk images that results in fully tessellated packing, on the sensor, with no dead space or overlap

| k | angle | width | height | aspect ratio |
|---|-------|-------|--------|--------------|
| 0 | 90    | 1     | 1      | 1:1          |
| 1 | 45    | 1.41  | 0.707  | 2:1          |
| 2 | 26.6  | 2.24  | 0.447  | 5:1          |
| 3 | 18.4  | 3.16  | 0.316  | 10:1         |
| 4 | 14.0  | 4.12  | 0.243  | 17:1         |

Notably, "k" may be any integer value. Further, "angle" may be any rotation that results in a similar tessellation pattern in any orientation. For example, angle, 90°−angle, 90°+angle, 180°−angle, 180°+angle, 270°−angle, and 270°+angle may all result in similar tessellation patterns.

FIG. 8A shows an embodiment using parameters in the table above where k=2, with an exit pupil 800 with an aspect ratio of 5:1. The microlens array 810 is rotated 26.6°. The segments 840 of the disk image 820 have a 5:1 aspect ratio and do not overlap. FIG. 8B shows the configuration where k=3, and an exit pupil 850 has an aspect ratio of 10:1. The microlens array 860 is rotated 18.4° relative to the exit pupil 850. The segments 890 of the disk images 870 have a 10:1 aspect ratio and do not overlap.

In at least one embodiment, the microlens array uses hexagonal packing. At specific MLA-to-exit pupil rotations, specific aspect ratios may be used for the exit pupil and disk images. With hexagonal microlens array packing, the following equations describe the system for integral values of k.

angle=atan(0.5*sqrt(3)/($k$+0.5))

width=SQRT(($k$+0.5)^2+(0.5*SQRT(3))^2)

height=SQRT(3)/($W$*2)

aspect_ratio=width:height where
k is a the sequence number
angle is the MLA-Exit Pupil rotation, in degrees
width is the width of the disk image, relative to the width at k=0
height is the height of the disk image, relative to the height at k=0
aspect_ratio is the aspect ratio of disk images that results in fully tessellated packing, on the sensor, with no dead space or overlap

| k | MLA-Exit Pupil rotation | width | height | aspect ratio |
|---|-------------------------|-------|--------|--------------|
| 0 | 60                      | 1     | 1      | 1:1          |
| 1 | 30                      | 1.73  | 0.5    | 3.5:1        |
| 2 | 19.1                    | 2.65  | 0.33   | 8:1          |
| 3 | 13.9                    | 3.61  | 0.24   | 15:1         |
| 4 | 10.9                    | 4.58  | 0.19   | 24:1         |

Notably, "k" may be any integer value. Further, "angle" may be any rotation that results in a similar tessellation pattern in any orientation. For example, angle, 90°−angle, 90°+angle, 180°−angle, 180°+angle, 270°−angle, and 270°+angle may all result in similar tessellation patterns.

Figures 9A, 9B:
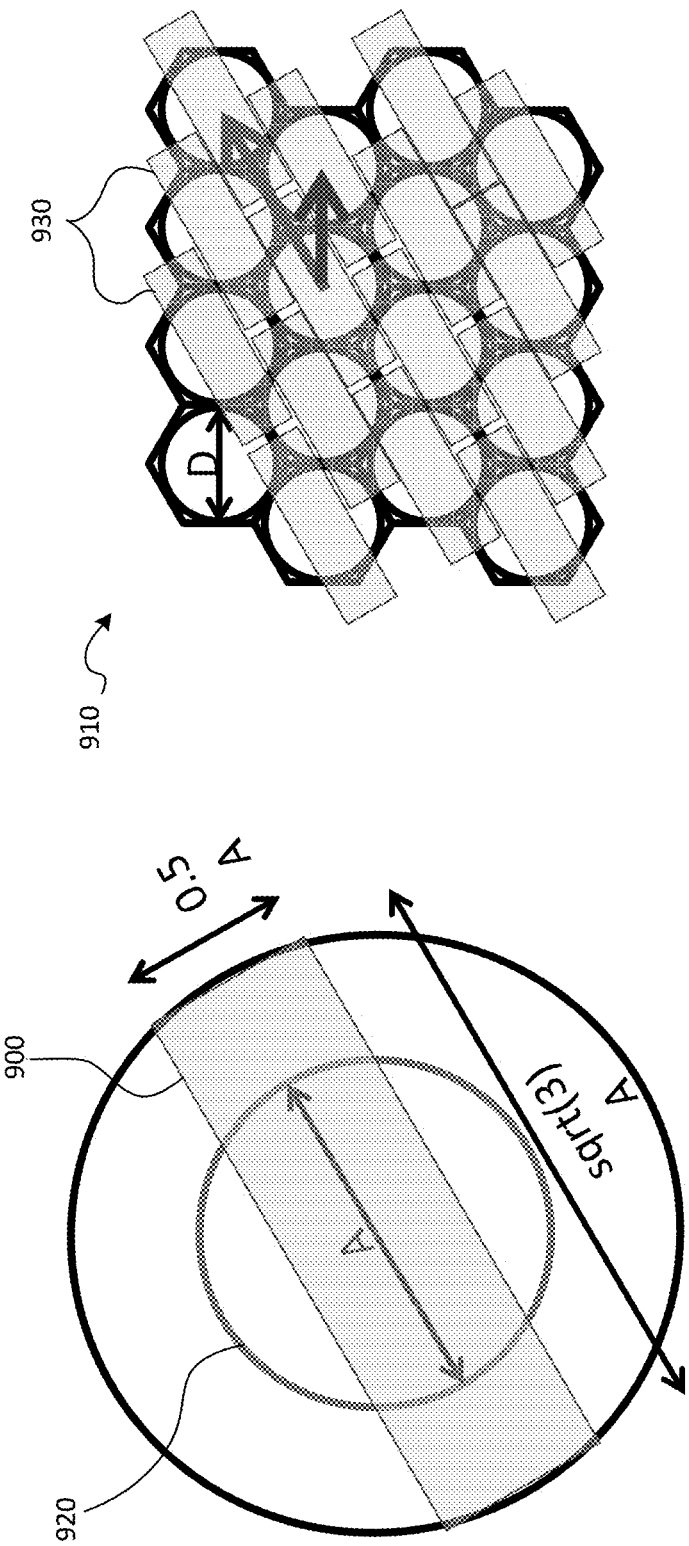
FIGS. 9A and 9B show exemplary embodiments with exit pupils of high aspect ratios, with nonzero rotational offsets applied between the exit pupils and the microlens arrays and hexagonal packing of microlenses, according to certain embodiments.

FIGS. 9A and 9B show an exit pupil 900 with an aspect ratio of approximately 3.5:1. The microlens array 910 uses hexagonal packing. The axes of the hexagonal lattice are rotated 30° relative to the long axis of the exit pupil 900. In FIG. 9A, A is the diameter of an exit pupil 920 that results in an optimal packing of circular disk images onto the sensor without overlap, given a hexagonal microlens array and a focal length. When the long axis of the exit pupil is rotated 30° relative to the hexagonal axes of the microlens array, the dimensions of a rectangular exit pupil that results in optimally packed disk images has a width of SQRT(3)*A and a height of A/2. FIG. 9B conceptually shows the packing of the rectangular disk images 930 relative to the hexagonally packed microlens array 910.

FIGS. 11A and 11B show further exemplary embodiments with hexagonally packed microlens arrays and disk images, consistent with k=1 in the table above. Specifically, FIGS. 11A and 11B show another way to implement the system in FIGS. 9A and 9B. Instead of increasing the dimension of the exit pupil 1120 from A to SQRT(3)*A as in FIGS. 9A and 9B, the width may be fixed to A, while the f/# of the microlens may be increased by SQRT(3) while the diameter of each microlens 1130 in the microlens array 1100 is decreased by the same factor. In this way, the density of the microlens array 1100 (within a fixed area) is increased and thus the overall spatial resolution can be improved.

Figure 12:
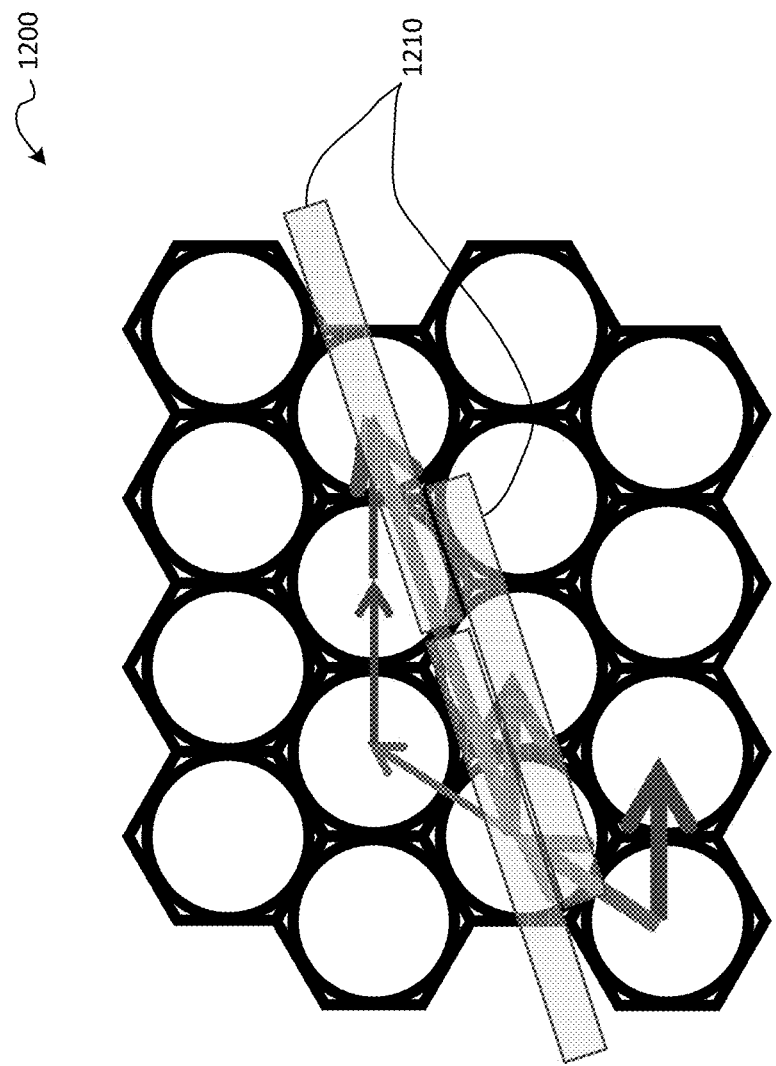
FIG. 12 shows an exemplary embodiment with an exit pupils of high aspect ratio, with nonzero rotational offsets applied between the exit pupils and the microlens arrays and hexagonal packing of microlenses, according to another embodiment.

FIG. 12 shows a hexagonally packed microlens array 1200 and disk images, consistent with k=2 in the table above. FIG. 12 conceptually shows the packing of the rectangular disk images 1210 relative to the hexagonally packed microlens array 1200, when the MLA-exit pupil rotation is approximately 19° and the aspect ratio of the exit pupil is approximately 8:1.

In at least one embodiment where the exit pupil has a high aspect ratio, the image sensor-to-exit pupil rotation may be 0°. In these embodiments, the axes of the disk images may align with the axes of the photosensor.

In at least one embodiment where the exit pupil has a high aspect ratio, the f/# of the microlens array may be slightly smaller than the f/# that may result in ideal tessellation of disk images with no gaps or overlap. The slightly smaller f/# may introduce small dark regions between disk images, and may reduce crosstalk between neighboring disk images when the light is captured by the photosensor.

One skilled in the art will recognize that the embodiments described herein may be extended to include any type of microlens packing. For example, in addition to the square, rectangular, hexagonal, and elliptical packing arrangements described herein, the microlens packing may be triangular, diamond shaped, or in any other pattern.

Discontinuous Aperture

In some embodiments, a disjointed or discontinuous exit pupil may be used. Embodiments of this type may be preferred, for example, when a larger optical baseline is desired, but decreasing the depth-of-field of the subviews is not.

Figure 18A:
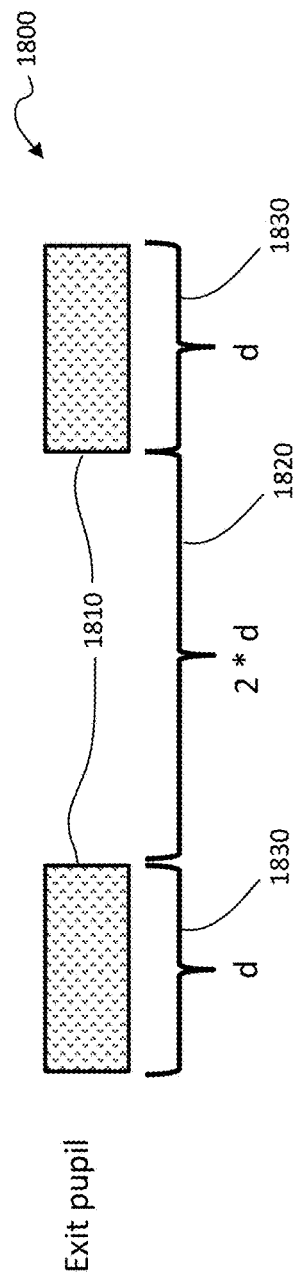
FIG. 18A conceptually shows a discontinuous exit pupil of two parts, according to one embodiment.

FIG. 18A conceptually shows a discontinuous exit pupil having two sections 1810 separated by a distance 1820 equal to the sum of the widths of each section. Each of the two sections 1810 may have a width 1830 equal to d, and the center gap may have a width equal to the distance 1820, which may be 2*d. In other embodiments, the two sections 1810 may have a total width that sums to 2d, where one section may have a width equal to d+x and the other a width equal to d−x. Compared to a system with Nu angular samples, a given depth-of-field in each subview, and an optical baseline of 2*d, this embodiment may have the same number of angular samples, the same depth-of-field in each subview, and double the optical baseline.

Figure 18B:
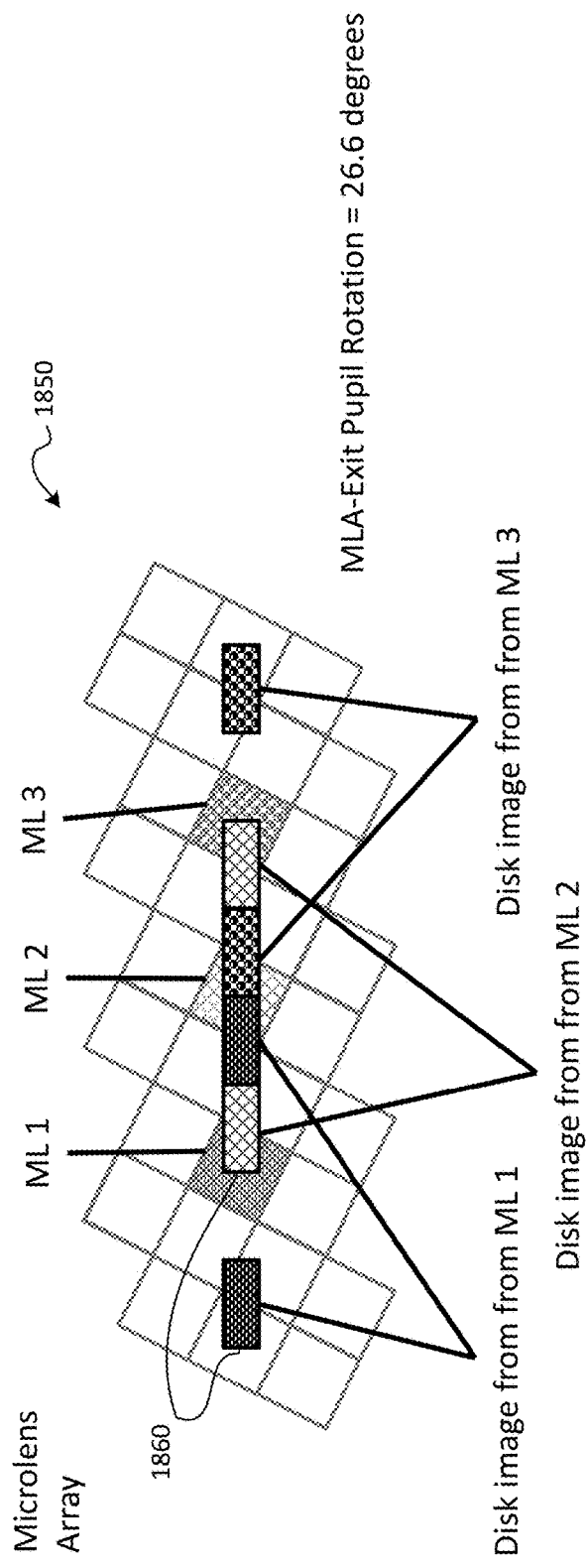
FIG. 18B shows how segments of a disk image created from a square packed microlens array and an exit pupil of this type may tessellate.

FIG. 18B shows how segments 1860 of a disk image created from a square packed microlens array 1850 and an exit pupil 1800 of this type may tessellate when the microlens array 1850 uses square packing and the MLA-to-exit pupil rotation is 26.6°. Notably, a discontinuous exit pupil that is divided into two parts like the exit pupil 1800 may be used in conjunction with various MLA-to-exit pupil rotations and packing patterns to increase or reduce the aspect ratio.

Figures 14A, 14B:
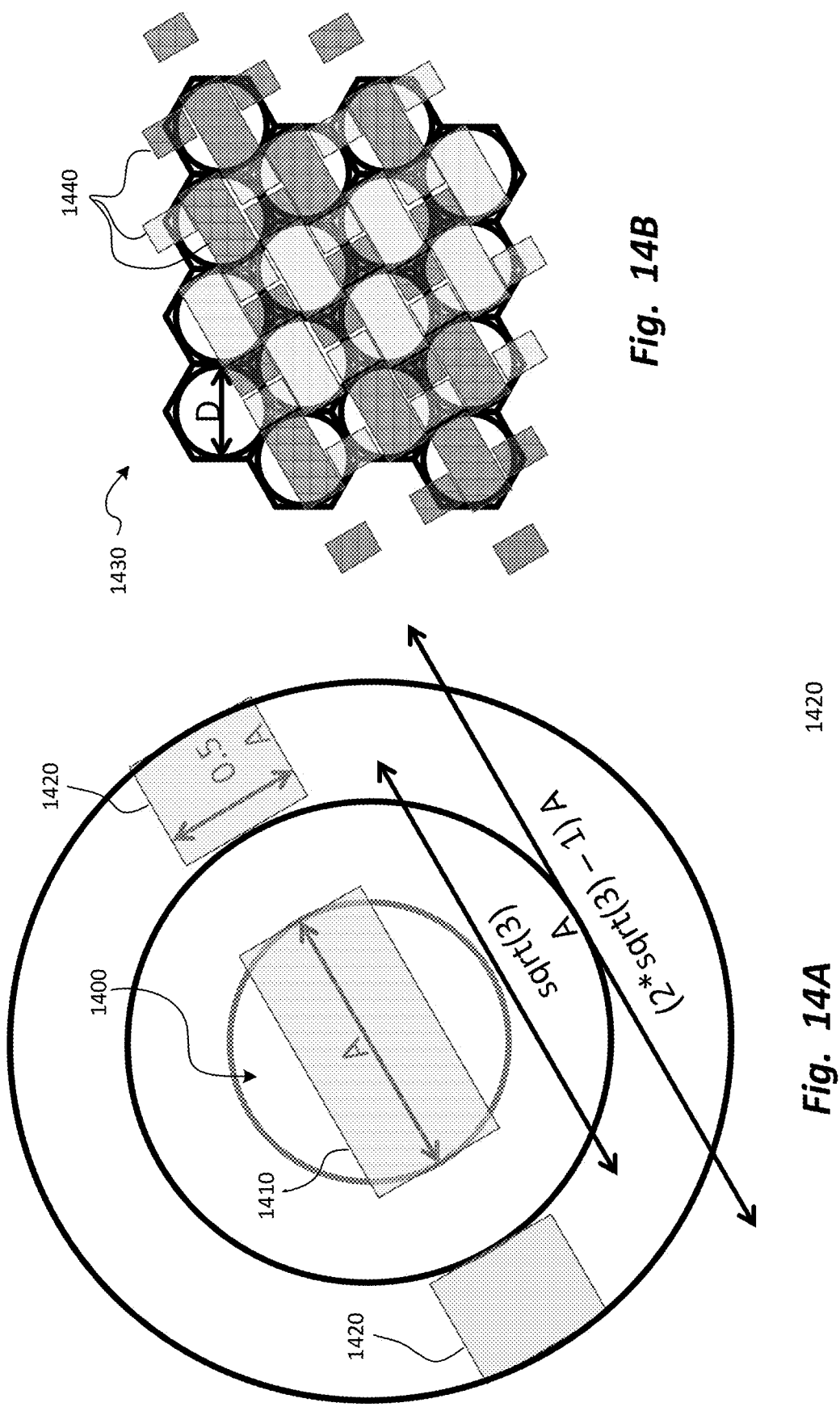
FIGS. 14A and 14B conceptually show a discontinuous aperture with three sections, according to one embodiment.

FIGS. 14A and 14B show another embodiment. In this example, the exit pupil 1400 contains three discontinuous sections: a wide center section 1410, and two narrow end sections 1420. FIG. 14B shows how the segments 1440 of the disk image tessellate relative to a microlens array 1430 using hexagonal packing. In other embodiments, the relative sizes of each section of a pupil with three discontinuous sections may be adjusted relative to each other to provide other tessellation patterns.

Figure 19B:
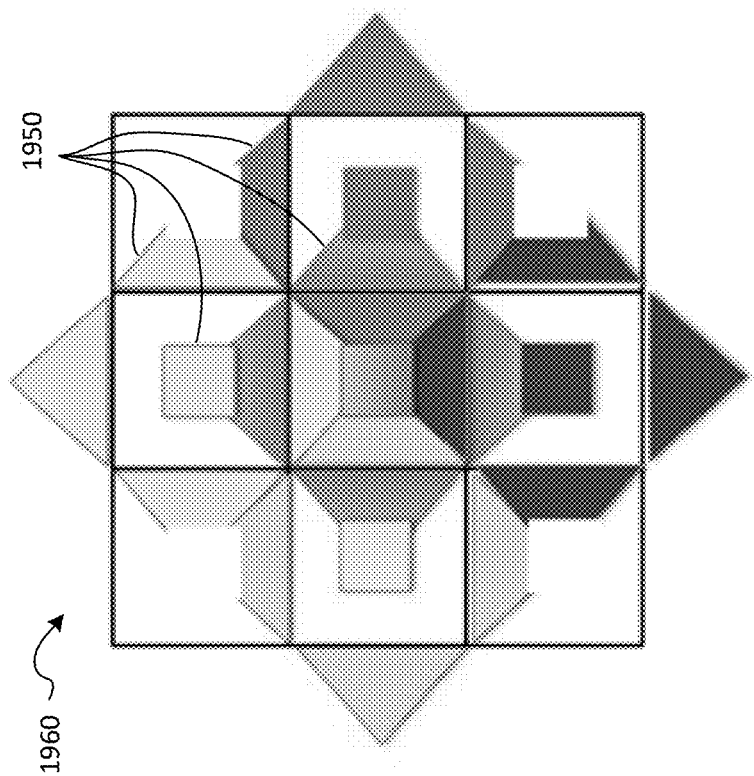
FIGS. 19A and 19B show two exemplary embodiments on a square packed microlens array, using an exit pupil that is discontinuous in two dimensions, according to one embodiment.
Figure 19A:
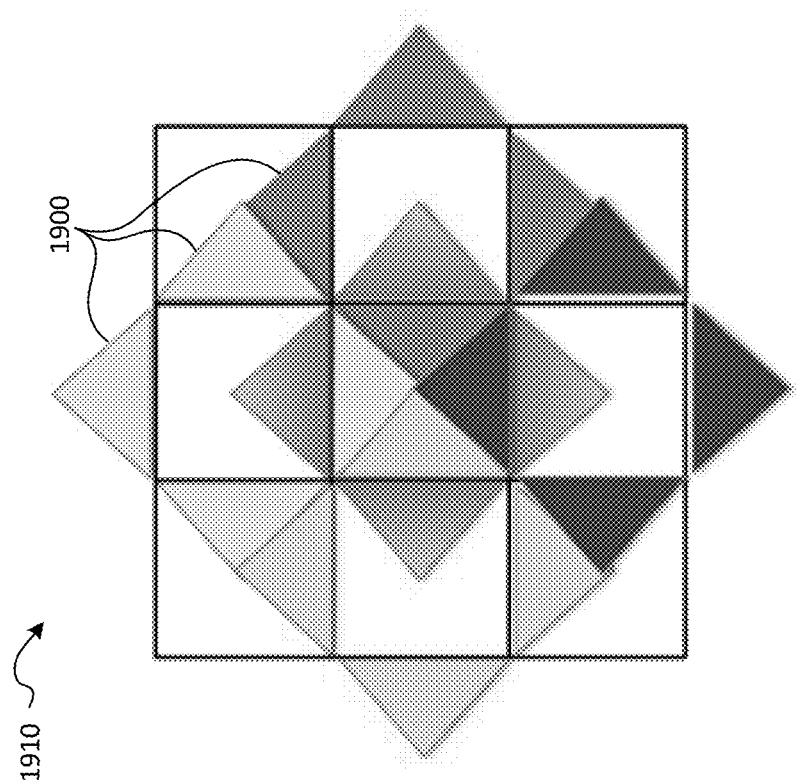

FIGS. 19A and 19B show two exemplary embodiments on a square packed microlens array, using an exit pupil that is discontinuous in two dimensions. Specifically, FIG. 19A illustrates segments 1900 of a disk image on a microlens array 1910, in which each segment 1900 includes four isosceles triangles oriented outward from an empty square. The empty square of each segment 1900 may be filled with the isosceles triangles of neighboring segments 1900. FIG. 19B illustrates segments 1950 of a disk image on a microlens array 1960, in which each segment 1950 includes a square and four trapezoids oriented outward from the square, which surrounded by a larger empty space with a square boundary. The empty space of each segment 1950 may be filled with the trapezoids of neighboring segments 1900.

One skilled in the art will recognize that the above embodiments are only a few of the many possible optical configurations that may use a discontinuous exit pupil. Discontinuous pupils may have any number of sections, which may be arranged in a wide variety of one-dimensional and/or two-dimensional patterns.

Sensor Alignment

In some of the embodiments described above, accurate and specific MLA-to-exit pupil rotation may be required for the disk images to properly tessellate on the photosensor without overlapping. In general, the image sensor-to-exit pupil rotation and the MLA-to-sensor rotation may be unspecified.

In some embodiments, the image sensor-to-exit pupil rotation is 0°, or substantially 0°. Alignment of the exit pupil axes with the axes of the photosensor may reduce crosstalk between disk images on the photosensor, and/or reduce the need for any "dead zone" allocated between disk images. In some embodiments, dead zones may be used to reduce crosstalk between disk images, typically, by slightly reducing the f/# of the microlens array relative to the objective lens.

Controllable Aperture

In at least one embodiment, a controllable and/or adjustable aperture mask may be used in conjunction with the embodiments described above and a lens with a low f/# compared to the f/# of the microlens array. FIGS. 20A through 20D conceptually show an embodiment that may use a variety of masks to create a light-field camera with different configurable properties, but without changing the microlens array, photosensor, and/or any additional aspect of the objective lens. In this exemplary embodiment, the microlens array may use square packing and have an f/# substantially equal to X.

FIG. 20A conceptually shows a fully "open" aperture 2000, which may have a lower f/# than the microlens array. When the mask is absent or fully open, the segments of the disk image in this exemplary embodiment may overlap, and the captured light-field data may not be usable.

FIG. 20B shows the aperture 2000 with a square mask 2020 applied.

With the square mask 2020 applied, the f/# of the objective lens may be substantially equal to X, and the segments of the disk image may tessellate on the photosensor with little dead space and/or overlap. A MLA-to-exit pupil rotation of 0° may be used. When the square mask 2020 is applied, the light-field camera may perform like a standard plenoptic light-field camera, with substantially equivalent sampling in both angular dimensions.

FIG. 20C shows the aperture 2000 with a mask 2040 having a 2:1 aspect ratio applied at or near the aperture plane. In order for the segments of the disk image to tessellate without overlap on the surface of the photosensor, an MLA-to-exit pupil rotation of 45° may be applied.

FIG. 20D shows the aperture 2000 with a mask 2060 having a 5:1 aspect ratio applied at or near the aperture plane. In order for the segments of the disk image to tessellate without overlap on the surface of the photosensor, an MLA-to-exit pupil rotation of 26.6° may be applied.

One skilled in the art will recognize that the controllable aperture can support any of the embodiments described in this document, and many others. For example, any of embodiments described in the Exit Pupils with High Aspect Ratio section are supported, for any value of k.

Notably, while the shape of the portion of the mask that allows light to pass may vary substantially, the total area of such portions may advantageously be substantially identical. As the number of the microlenses in the microlens array may be unchanging, and the size of the photosensor may be unchanging, the total area allocated to each disk image such that there is minimal dead space and/or overlap, may also be unchanging.

Further, while the exemplary embodiment shows how aperture masks may be used to vary the aspect ratio of an exit pupil on a system with a square packed microlens array, it should be clear to one skilled in the art that the concept naturally extends to alternative microlens array using alternative packing (for example, hexagonal, rectangular, elliptical, etc.) and/or alternative exit pupil designs (for example, a discontinuous aperture).

In at least one embodiment, an LCD panel may be placed at or near the aperture plane. The LCD panel may allow light to pass through certain areas of the aperture, while blocking light passage through other areas. As LCD panels may be manufactured with very high resolutions, nearly arbitrary mask shapes may be generated. The LCD panel mask may be controlled in any manner, including but not limited to manual control, automatic control and/or control via a user interface on the camera system.

In at least one embodiment, mechanical masks may be inserted into and/or removed from the aperture plane. The mechanical masks may be made from any suitable material, for example thin sheets of black plastic or black anodized aluminum. The material may be cut to remove the portions through which light is to pass. In one embodiment, the objective lens may have a slit in the side that allows users to manually apply and/or remove mechanical aperture masks. In another embodiment, the objective lens may include one or more mechanical masks that may be automatically changed. The mechanical mask insertion and/or removal may be controlled in any manner, including manual control, automatic control and/or controlled by a user interface on the camera system.

In some embodiments, various masks, such as the square mask 2020, the mask 2040, and the mask 2060, may be provided in a single camera through the use of a movable element on which all of the masks are located. For example, a rotatable disk may have masks that can be selectively rotated into alignment with the aperture. Alternatively, a rectangular strip may have masks arranged in a linear fashion such that translation of the strip can selectively move the masks into alignment with the aperture. Alternatively, various movable elements can be combined to provide a mask with a changeable shape. For example, four rectangular plates may be movable toward or away from the center of the aperture to effectively provide the square mask 2020, the mask 2040, and/or the mask 2060. Thus, the user of the light-field camera may select the appropriate mask for each shot.

Alternatively, other approaches can be used for selectively allowing light to pass through certain areas of the aperture, while blocking light passage through other areas. Any known system for providing variable light passage may be used.

Processing

Processing of the light-field images from the embodiments listed above may be performed using the same algorithms and techniques generally used to process light-field images. In at least one embodiment, some changes are made to such algorithms and techniques so that they better suit the architectures described herein.

During processing of light-field images, each pixel on the photosensor (having raster position (s, t) in the light-field image) may be mapped to a light-field coordinate (x, y, u, v).

$$(x,y,u,v)=f(s,t)$$

In a system using one of the embodiments described herein, a masking function may be used to help create this mapping. In one embodiment, the mapping of raster coordinates to light-field coordinates may be performed with an algorithm such as the following:

```
diskImageList = lightField.getDiskImageList( )
for each diskImage in diskImageList
    x = diskImage.center.s / lightField.raster.width
    y = diskImage.center.t / lightField.raster.height
    bb = diskImage.boundingBox
    for (t=bb.startT; t<bb.endT; t++)
        for (s=bb.startS; s<bb.endS; s++)
            if (diskImage.mask.contains(s, t)
                deltaS = diskImage.center.s − s
                deltaT = diskImage.center.t − t
                u = lightField.deltaPixelsToAngularCoord(deltaS)
                v = lightField.deltaPixelsToAngularCoord(deltaT)
``` where:

lightField is a light-field image object. The object has a list of disk images, determined previously (for example, during a calibration process) or calculated as needed (for example, from a geometric and/or optical model of the camera system).

x and y are the spatial light-field coordinates, in a normalized 0 to 1 range.

diskImage is a disk image object. Each disk image knows the location of its center coordinate, contains a bounding box outside of which are no pixels in the disk image, and a masking test function that returns true if a raster coordinate contains image data associated with the disk image.

u and v are the angular light-field coordinates, centered at 0.

deltaPixelsToAngularCoord is a conversion function that converts from linear pixel offsets to an angular coordinate. The input is the offset of a raster coordinate from the center location of the disk image containing that coordinate along a single dimension.

Once the light-field coordinates have been generated, processing of the light-field image may be carried out in a manner similar to those set forth in prior art descriptions of light-field image processing. The resulting light-field image may have enhanced angular resolution along one dimension, which may facilitate and/or enhance the manner in which the light-field image may be used.

The above description and referenced drawings set forth particular details with respect to possible embodiments. Those of skill in the art will appreciate that the techniques described herein may be practiced in other embodiments. First, the particular naming of the components, capitalization of terms, the attributes, data structures, or any other programming or structural aspect is not mandatory or significant, and the mechanisms that implement the techniques described herein may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

Some embodiments may include a system or a method for performing the above-described techniques, either singly or in any combination. Other embodiments may include a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions of described herein can be embodied in software, firmware and/or hardware, and when embodied in software, can be downloaded to reside on and be operated from different platforms used by a variety of operating systems.

Some embodiments relate to an apparatus for performing the operations described herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic or optical cards, application specific integrated circuits (ASICs), and/or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the techniques set forth herein are not described with reference to any particular programming language. It will be appreciated that a variety of programming languages may be used to implement the techniques described herein, and any references above to specific languages are provided for illustrative purposes only.

Accordingly, in various embodiments, the techniques described herein can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the techniques described herein include: a mobile phone, personal digital assistant, smartphone, kiosk, server computer, enterprise computing device, desktop computer, laptop computer, tablet computer, consumer electronic device, television, set-top box, or the like. An electronic device for implementing the techniques described herein may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

In various embodiments, the techniques described herein can be implemented in a distributed processing environment, networked computing environment, or web-based computing environment. Elements can be implemented on client computing devices, servers, routers, and/or other network or non-network components. In some embodiments, the techniques described herein are implemented using a client/server architecture, wherein some components are implemented on one or more client computing devices and other components are implemented on one or more servers. In one embodiment, in the course of implementing the techniques of the present disclosure, client(s) request content from server(s), and server(s) return content in response to the requests. A browser may be installed at the client computing device for enabling such requests and responses, and for providing a user interface by which the user can initiate and control such interactions and view the presented content.

Any or all of the network components for implementing the described technology may, in some embodiments, be communicatively coupled with one another using any suitable electronic network, whether wired or wireless or any combination thereof, and using any suitable protocols for enabling such communication. One example of such a network is the Internet, although the techniques described herein can be implemented using other networks as well.

While a limited number of embodiments has been described herein, those skilled in the art, having benefit of the above description, will appreciate that other embodiments may be devised which do not depart from the scope of the claims. In addition, it should be noted that the language used in the specification has been principally selected for readability and instructional purposes, and may not have been selected to delineate or circumscribe the inventive subject matter. Accordingly, the disclosure is intended to be illustrative, but not limiting.

What is claimed is:

1. A light-field camera comprising:
    an aperture configured to receive incoming light and having a rectangular exit pupil;
    an image sensor;
    a microlens array disposed between the aperture and the image sensor, wherein the microlens array comprises a plurality of microlenses arranged in a plurality of rows, each row arranged at a non-zero acute angle relative to the rectangular exit pupil; and
    wherein the image sensor is configured to generate light-field data based on the incoming light received through the microlens array.

2. The light-field camera of claim 1, wherein the plurality of microlenses comprises a plurality of rectangular microlenses.

3. The light-field camera of claim 1, wherein the plurality of microlenses comprises a plurality of circular microlenses.

4. The light-field camera of claim 1, wherein the plurality of microlenses comprises a plurality of hexagonal microlenses.

5. The light-field camera of claim 1, wherein a width of the rectangular exit pupil is greater than a length of the rectangular exit pupil.

6. The light-field camera of claim 1, wherein the rectangular exit pupil is shared and oriented, relative to the microlens array, such that the incoming light received through the microlens array forms a tessellated pattern at the image sensor.

7. The light-field camera of claim 1, further comprising:
    a main lens through which the incoming light is to pass through prior to redirection by the microlens array.

8. The light-field camera of claim 1, further comprising:
    a masking system configured to position at least one of a plurality of masks proximate the aperture, wherein the masks define a plurality of exit pupils having a plurality of different shapes, each of which defines an exit pupil for the aperture, the plurality of exit pupils including the rectangular exit pupil.

9. A light-field camera comprising:
    an aperture configured to receive incoming light and having a rectangular exit pupil;
    an image sensor;
    a microlens array disposed between the aperture and the image sensor, wherein the microlens array is rotated by a non-zero acute angle relative to the rectangular exit pupil; and
    wherein the image sensor is configured to generate light-field data based on the incoming light received through the microlens array.

10. The light-field camera of claim 9, wherein the microlens array comprises one of: a plurality of rectangular microlenses; a plurality of circular microlenses; and a plurality of hexagonal microlenses.

11. The light-field camera of claim 9, wherein a width of the rectangular exit pupil is greater than a length of the rectangular exit pupil.

12. The light-field camera of claim 9, wherein the rectangular exit pupil is shared and oriented, relative to the microlens array, such that the incoming light received through the microlens array forms a tessellated pattern at the image sensor.

13. The light-field camera of claim 9, further comprising:
    a main lens through which the incoming light is to pass through prior to redirection by the microlens array.

14. The light-field camera of claim 9, further comprising:
    a masking system configured to position at least one of a plurality of masks proximate the aperture, wherein the masks define a plurality of exit pupils having a plurality of different shapes, each of which defines an exit pupil for the aperture, the plurality of exit pupils including the rectangular exit pupil.

* * * * *